(12) United States Patent
Lai et al.

(10) Patent No.: US 10,353,174 B2
(45) Date of Patent: *Jul. 16, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Chien-Hsun Lai, Taichung (TW); Nai-Yuan Tang, Taichung (TW); Yeong-Ming Chang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 345 days.

This patent is subject to a terminal disclaimer.

(21) Appl. No.: 15/239,132

(22) Filed: Aug. 17, 2016

(65) Prior Publication Data
US 2017/0315327 A1    Nov. 2, 2017

(30) Foreign Application Priority Data
Apr. 28, 2016    (TW) .............................. 105113334 A

(51) Int. Cl.
*G02B 3/02* (2006.01)
*G02B 13/00* (2006.01)

(52) U.S. Cl.
CPC .................. *G02B 13/004* (2013.01)

(58) Field of Classification Search
CPC .................................................. G02B 13/0045
USPC ........................................................... 359/713
See application file for complete search history.

(56) References Cited

U.S. PATENT DOCUMENTS

2007/0081259 A1    4/2007  Noda
2014/0078603 A1*   3/2014  You ................... G02B 13/0045
                                                      359/738

FOREIGN PATENT DOCUMENTS

| CN | 103869452 A | 8/2012 |
| TW | 201232090 A | 8/2012 |
| TW | M503575 U   | 6/2015 |

* cited by examiner

*Primary Examiner* — James C. Jones
(74) *Attorney, Agent, or Firm* — Muncy, Geissler, Olds & Lowe, P.C.

(57) ABSTRACT

A four-piece optical lens for capturing image and a five-piece optical module for capturing image are provided. In the order from an object side to an image side, the optical lens along the optical axis includes a first lens with positive refractive power; a second lens with refractive power; a third lens with refractive power; and a fourth lens with refractive power; and at least one of the image-side surface and object-side surface of each of the four lens elements are aspheric. The optical lens can increase aperture value and improve the imagining quality for use in compact cameras.

25 Claims, 18 Drawing Sheets

OPTICAL IMAGE CAPTURING SYSTEM

CROSS-REFERENCE TO RELATED APPLICATION

This application claims priority from Taiwan Patent Application No. 105113334, filed on Apr. 28, 2016, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a second-lens or a third-lens design. However, the requirement for the higher pixels and the requirement for a large aperture of an end user, like functionalities of micro filming and night view, or the requirement of wide view angle of the portable electronic device have been raised. But the optical image capturing system with the large aperture design often produces more aberration, resulting in the deterioration of quality in peripheral image formation and difficulties of manufacturing, and the optical image capturing system with wide view angle design increases distortion rate in image formation, thus the optical image capturing system in prior arts cannot meet the requirement of the higher order camera lens module.

Therefore, how to effectively increase quantity of incoming light and view angle of the optical lenses, not only further improves total pixels and imaging quality for the image formation, but also considers the equity design of the miniaturized optical lenses, becomes a quite important issue.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) to increase the quantity of incoming light of the optical image capturing system and the view angle of the optical lenses, and to improve total pixels and imaging quality for image formation, so as to be applied to minimized electronic products.

The term and its definition to the lens element parameter in the embodiment of the present invention are shown as below for further reference.

The lens element parameter related to a length or a height in the lens element

The height of an image formed by the optical image capturing system is denoted by HOI. The height of the optical image capturing system is denoted by HOS. A distance from the object-side surface of the first lens element to the image-side surface of the fourth lens element is denoted by InTL. A distance from the image-side surface of the fourth lens element to an image plane is denoted by InB, where InTL+InB=HOS. A distance from an aperture stop (aperture) to an image plane is denoted by InS. A distance from the first lens element to the second lens element is denoted by In12 (example). A central thickness of the first lens element of the optical image capturing system on the optical axis is denoted by TP1 (example).

The Lens Element Parameter Related to the Material in the Lens Element

An Abbe number of the first lens element in the optical image capturing system is denoted by NA1 (example). A refractive index of the first lens element is denoted by Nd1 (example).

The Lens Element Parameter Related to View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. A maximum effective half diameter (EHD) of any surface of a single lens element refers to a perpendicular height between the optical axis and an intersection point where the incident ray with the maximum view angle passes through the outmost edge of the entrance pupil and intersects with the surface of the lens element. For example, the maximum effective half diameter of the object-side surface of the first lens element is denoted by EHD 11. The maximum effective half diameter of the image-side surface of the first lens element is denoted by EHD 12. The maximum effective half diameter of the object-side surface of the second lens element is denoted by EHD 21. The maximum effective half diameter of the image-side surface of the second lens element is denoted by EHD 22. The maximum effective half diameters of any surfaces of other lens elements in the optical image capturing system are denoted in the similar way.

The Lens Element Parameter Related to a Depth of the Lens Element Shape

A distance paralleling an optical axis from a maximum effective half diameter position to an axial point on the object-side surface of the fourth lens element is denoted by InRS41 (example). A distance paralleling an optical axis from a maximum effective half diameter position to an axial point on the image-side surface of the fourth lens element is denoted by InRS42 (example).

The Lens Element Parameter Related to the Lens Element Shape

A critical point C is a tangent point on a surface of a specific lens element, and the tangent point is tangent to a plane perpendicular to the optical axis and the tangent point cannot be the axial point of the lens element surface. Furthermore, a perpendicular distance between a critical point C31 on the object-side surface of the third lens element and the optical axis is HVT31 (example). A perpendicular distance between a critical point C32 on the image-side surface of the third lens element and the optical axis is HVT32 (example). A perpendicular distance between a critical point C41 on the object-side surface of the fourth lens element and the optical axis is HVT41 (example). A perpendicular distance between a critical point C42 on the image-side surface of the fourth lens element and the optical axis is HVT42 (example). The perpendicular distances between the critical point on the image-side surface or object-side surface of other lens elements are denoted in similar fashion.

The object-side surface of the fourth lens element has one inflection point IF411 which is nearest to the optical axis, and the sinkage value of the inflection point IF411 is denoted by SGI411. SGI411 is a horizontal shift distance paralleling the optical axis from an axial point on the object-side surface of the fourth lens element to the inflection point which is nearest to the optical axis on the object-side surface of the fourth lens element. A distance perpendicular to the optical axis between the inflection point IF411 and the optical axis is HIF411 (example). The image-side surface of the fourth lens element has one inflection point IF421 which is nearest to the optical axis and the sinkage value of the inflection point IF421 is denoted by SGI421 (example). SGI421 is a horizontal shift distance paralleling the optical axis from an axial point on the image-side surface of the fourth lens element to the inflection point which is nearest to the optical axis on the image-side surface of the fourth lens element. A distance perpendicular to the optical axis between the inflection point IF421 and the optical axis is HIF421 (example).

The object-side surface of the fourth lens element has one inflection point IF412 which is the second nearest to the optical axis and the sinkage value of the inflection point IF412 is denoted by SGI412 (example). SGI412 is a horizontal shift distance paralleling the optical axis from an axial point on the object-side surface of the fourth lens element to the inflection point which is the second nearest to the optical axis on the object-side surface of the fourth lens element. A distance perpendicular to the optical axis between the inflection point IF412 and the optical axis is HIF412 (example). The image-side surface of the fourth lens element has one inflection point IF422 which is the second nearest to the optical axis and the sinkage value of the inflection point IF422 is denoted by SGI422 (example). SGI422 is a horizontal shift distance paralleling the optical axis from an axial point on the image-side surface of the fourth lens element to the inflection point which is second nearest to the optical axis on the image-side surface of the fourth lens element. A distance perpendicular to the optical axis between the inflection point IF4222 and the optical axis is HIF422 (example).

The object-side surface of the fourth lens element has one inflection point IF413 which is the third nearest to the optical axis and the sinkage value of the inflection point IF413 is denoted by SGI413 (example). SGI413 is a horizontal shift distance paralleling the optical axis from an axial point on the object-side surface of the fourth lens element to the inflection point which is the third nearest to the optical axis on the object-side surface of the fourth d lens element. A distance perpendicular to the optical axis between the inflection point IF413 and the optical axis is HIF413 (example). The image-side surface of the fourth lens element has one inflection point IF423 which is the third nearest to the optical axis and the sinkage value of the inflection point IF423 is denoted by SGI423 (example). SGI423 is a horizontal shift distance paralleling the optical axis from an axial point on the image-side surface of the fourth lens element to the inflection point which is the third nearest to the optical axis on the image-side surface of the fourth lens element. A distance perpendicular to the optical axis between the inflection point IF423 and the optical axis is HIF423 (example).

The object-side surface of the fourth lens element has one inflection point IF414 which is the fourth nearest to the optical axis and the sinkage value of the inflection point IF414 is denoted by SGI414 (example). SGI414 is a horizontal shift distance paralleling the optical axis from an axial point on the object-side surface of the fourth lens element to the inflection point which is the fourth nearest to the optical axis on the object-side surface of the fourth lens element. A distance perpendicular to the optical axis between the inflection point IF414 and the optical axis is HIF414 (example). The image-side surface of the fourth lens element has one inflection point IF424 which is the fourth nearest to the optical axis and the sinkage value of the inflection point IF424 is denoted by SGI424 (example). SGI424 is a horizontal shift distance paralleling the optical axis from an axial point on the image-side surface of the fourth lens element to the inflection point which is the fourth nearest to the optical axis on the image-side surface of the fourth lens element. A distance perpendicular to the optical axis between the inflection point IF424 and the optical axis is HIF424 (example).

The inflection points on the object-side surface or the image-side surface of the other lens elements and the perpendicular distances between them and the optical axis, or the sinkage values thereof are denoted in the similar way described above.

The Lens Element Parameter Related to an Aberration

Optical distortion for image formation in the optical image capturing system is denoted by ODT. TV distortion for image formation in the optical image capturing system is denoted by TDT. Furthermore, the range of the aberration offset for the view of image formation may be limited to 50%-100%. An offset of the spherical aberration is denoted by DFS. An offset of the coma aberration is denoted by DFC.

The purpose of the characteristic diagram of Modulation Transfer Function (MTF) of the optical image capturing system is to test and assess the contrast and sharpness of the image formed by the system. The vertical coordinate axis of the characteristic diagram of modulation transfer function represents a modulation transfer rate (values are from 0 to 1). The horizontal coordinate axis represents a spatial frequency (cycles/mm; 1 p/mm; line pairs per mm). Theoretically, an ideal optical image capturing system can present 100% of the line contrast of a photographed object. However, the values of the modulation transfer function at the vertical coordinate axis are less than 1 in the actual image capturing system. In addition, comparing to the central region, it is generally more difficult to achieve fine recovery in the peripheral region of formed image. The modulation transfer rates (values of MTF) of spatial frequency of 55 cycles/mm at positions of the optical axis, 0.3 field of view and 0.7 field of view of a visible light spectrum on the image plane are respectively denoted by MTFE0, MTFE3 and MTFE7. The modulation transfer rates (values of MTF) of spatial frequency of 110 cycles/mm at the optical axis, 0.3 field of view and 0.7 field of view on the image plane are respectively denoted by MTFQ0, MTFQ3 and MTFQ7. The modulation transfer rates (values of MTF) of spatial frequency of 220 cycles/mm at the optical axis, 0.3 field of view and 0.7 field of view on the image plane are respectively denoted by MTFH0, MTFH3 and MTFH7. The modulation transfer rates (values of MTF) of spatial frequency of 440 cycles/mm at the optical axis, 0.3 field of view and 0.7 field of view on the image plane are respectively denoted by MTF0, MTF3 and MTF7. The three fields of view described above represent the center, the inner field of view and the outer field of view of the lens elements. Thus, they may be used to evaluate whether the performance of a specific optical image capturing system is excellent. The design of the optical image capturing system of the present invention mainly corresponds to a sensing device with pixel size below 1.12 micrometers inclusive. Therefore, the quarter spatial frequency, the half spatial frequency (half frequencies) and the full spatial frequency (full frequencies) of the characteristic diagram of modulation transfer function respectively are at least 110 cycles/mm, 220 cycles/mm and 440 cycles/mm.

If an optical image capturing system is to capture image with infrared spectrum, such as meeting the requirement for night vision in low light condition, it might apply operation wavelength of 850 nm or 800 nm. As the main function is to recognize silhouette of an object formed in monochrome and shade, the high resolution is unnecessary, and thus, a spatial frequency, which is less than 110 cycles/mm, is used to evaluate the functionality of the optical image capturing system, when the optical image capturing system is applied to the infrared spectrum. When the foregoing wavelength of 850 nm is to be focused on the image plane, the modulation transfer rates (values of MTF) with a spatial frequency of 55 cycles/mm at the optical axis, 0.3 field of view and 0.7 field of view on the image plane are respectively denoted by MTFI0, MTFI3 and MTFI7. However, as the difference between infrared wavelength of 850 nm or 800 nm and that of visible light is huge, it is hard to design an optical image capturing system which is capable of focusing on the visible light and the infrared light (dual-mode) simultaneously while achieving certain performance respectively.

The disclosure provides an optical image capturing system, which is capable of focusing visible light and Infrared (dual-mode) simultaneously, so as to achieve certain functions individually. An object-side surface or an image-side surface of the fourth lens element may have inflection points, such that the angle of incidence from each field of view to the fourth lens element can be adjusted effectively and the optical distortion and the TV distortion can be corrected as well. Besides, the surfaces of the fourth lens element may have a better optical path adjusting ability to acquire better imaging quality.

The disclosure provides an optical image capturing system, in the order from an object side to an image side including a first, second, third and fourth lens elements and an image plane. The first lens element has refractive power. Focal lengths of the first through fourth lens elements are f1, f2, f3 and f4 respectively. The focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the fourth lens element is InTL. Half of the maximum viewable angle of the optical image capturing system is denoted by HAF. Thicknesses of the first to fourth lens elements at the height of ½ HEP paralleling the optical axis are respectively ETP1, ETP2, ETP3 and ETP4. A sum of ETP1 to ETP4 described above is SETP. Central thicknesses of the first to fourth lens elements on the optical axis are respectively TP1, TP2, TP3 and TP4. A sum of TP1 to TP4 described above is STP. The following conditions are satisfied: 1.0≤f/HEP≤10.0, 0 deg<HAF≤150 deg and 0.5≤SETP/STP<1.

The disclosure also provides an optical image capturing system, in an order from an object side to an image side including a first, second, third and fourth lens elements and an image plane. The first lens element has refractive power. The second lens element has refractive power. The third lens element has refractive power. The fourth lens element has refractive power. At least two lens elements among the first to fourth lens elements respectively have at least one inflection point on at least one surface thereof. At least one of the second to fourth lens elements has positive refractive power. Focal lengths of the first through fourth lens elements are f1, f2, f3 and f4 respectively. A focal length of the optical image capturing system is f. An entrance pupil diameter of the optical image capturing system is HEP. A distance on the optical axis from an object-side surface of the first lens element to the image plane is HOS. A distance on the optical axis from the object-side surface of the first lens element to the image-side surface of the fourth lens element is InTL. Half of the maximum viewable angle of the optical image capturing system is denoted by HAF. A horizontal distance paralleling the optical axis from a coordinate point on the object-side surface of the first lens element at height of ½ HEP to the image plane is ETL. A horizontal distance paralleling the optical axis from a coordinate point on the object-side surface of the first lens element at height of ½ HEP to a coordinate point on the image-side surface of the fourth lens element at height of ½ HEP is EIN. The following conditions are satisfied: 1.0≤f/HEP≤10, 0 deg<HAF≤150 deg and 0.2≤EIN/ETL<1.

The disclosure further provides an optical image capturing system, in an order from an object side to an image side including a first, second, third and fourth lens elements and an image plane. At least one of the object-side surface and the image-side surface of the fourth lens element has at least one inflection point, wherein there are four lens elements having refractive power in the optical image capturing system. The first lens element has negative refractive power. The second lens element has refractive power. The third lens element has refractive power. The fourth lens element has refractive power. Focal lengths of the first through fourth lens elements are f1, f2, f3 and f4 respectively. A focal length of the optical image capturing system is f. An entrance pupil diameter of the optical image capturing system is HEP. A distance on the optical axis from an object-side surface of the first lens element to the image plane is HOS. A distance on the optical axis from the object-side surface of the first lens element to the image-side surface of the fourth lens element is InTL. Half of the maximum viewable angle of the optical image capturing system is denoted by HAF. A horizontal distance paralleling the optical axis from a coordinate point on the object-side surface of the first lens element at height of ½ HEP to the image plane is ETL. A horizontal distance paralleling the optical axis from a coordinate point on the object-side surface of the first lens element at height of ½ HEP to a coordinate point on the image-side surface of the fourth lens element at height of ½ HEP is EIN. The following conditions are satisfied: 1.0≤f/HEP≤10.0, 0 deg<HAF≤150 deg and 0.2≤EIN/ETL<1.

The thickness of a single lens element at height of ½ entrance pupil diameter (HEP) particularly affects the performance in correcting the optical path difference between the rays in each field of view and in correcting aberration for the shared region among the fields of view within the range of ½ entrance pupil diameter (HEP). The capability of aberration correction is enhanced when the thickness is greater, but the difficulty in manufacturing such lens also increases at the same time. Therefore, it is necessary to control the thickness of a single lens element at height of ½ entrance pupil diameter (HEP), in particular to control the proportional relation (ETP/TP) of the thickness (ETP) of the lens element at height of ½ entrance pupil diameter (HEP) to the thickness (TP) of the corresponding lens element on the optical axis. For example, the thickness of the first lens element at height of ½ entrance pupil diameter (HEP) is denoted by ETP1. The thickness of the second lens element at height of ½ entrance pupil diameter (HEP) is denoted by ETP2. The thicknesses of other lens elements are denoted in similar way. A sum of ETP1 to ETP4 described above is SETP. The embodiments of the present invention may satisfy the following condition: 0.3≤SETP/EIN≤1.

In order to enhance the capability of aberration correction and reduce the difficulty in manufacturing at the same time, it is particularly necessary to control the proportional relation (ETP/TP) of the thickness (ETP) of the lens element at height of ½ entrance pupil diameter (HEP) to the thickness (TP) of the lens element on the optical axis. For example, the thickness of the first lens element at height of ½ entrance pupil diameter (HEP) is denoted by ETP1. The thickness of the first lens element on the optical axis is TP1. The ratio between both of them is ETP1/TP1. The thickness of the second lens element at height of ½ entrance pupil diameter (HEP) is denoted by ETP2. The thickness of the second lens element on the optical axis is TP2. The ratio between both of them is ETP2/TP2. The proportional relations of the thicknesses of other lens element in the optical image capturing system at height of ½ entrance pupil diameter (HEP) to the thicknesses (TP) of the lens elements on the optical axis lens are denoted in the similar way. The embodiments of the present invention may satisfy the following condition: 0<ETP/TP≤5.

A horizontal distance between two adjacent lens elements at height of ½ entrance pupil diameter (HEP) is denoted by ED. The horizontal distance (ED) described above is in parallel with the optical axis of the optical image capturing system and particularly affects the performance in correcting the optical path difference between the rays in each field of view and in correcting aberration for the shared region among the fields of view within the range of ½ entrance pupil diameter (HEP). The capability of aberration correction may be enhanced when the horizontal distance becomes greater, but the difficulty in manufacturing the lens is also increased and the degree of 'minimization' to the length of the optical image capturing system is restricted. Thus, it is essential to control the horizontal distance (ED) between two specific adjacent lens elements at height of ½ entrance pupil diameter (HEP).

In order to enhance the capability of aberration correction and reduce the difficulty for 'minimization' to the length of the optical image capturing system at the same time, it is particularly necessary to control the proportional relation (ED/IN) of the horizontal distance (ED) between the two adjacent lens elements at height of ½ entrance pupil diameter (HEP) to the horizontal distance (IN) between the two adjacent lens elements on the optical axis. For example, the horizontal distance between the first lens element and the second lens element at height of ½ entrance pupil diameter (HEP) is denoted by ED12. The horizontal distance between the first lens element and the second lens element on the optical axis is IN12. The ratio between both of them is ED12/IN12. The horizontal distance between the second lens element and the third lens element at height of ½ entrance pupil diameter (HEP) is denoted by ED23. The horizontal distance between the second lens element and the third lens element on the optical axis is IN23. The ratio between both of them is ED23/IN23. The proportional relations of the horizontal distances between other two adjacent lens elements in the optical image capturing system at height of ½ entrance pupil diameter (HEP) to the horizontal distances between the two adjacent lens elements on the optical axis are denoted in the similar way.

A horizontal distance paralleling the optical axis from a coordinate point on the image-side surface of the fourth lens element at height ½ HEP to the image plane is EBL. A horizontal distance paralleling the optical axis from an axial point on the image-side surface of the fourth lens element to the image plane is BL. The embodiments of the present invention are able to enhance the capability of aberration correction and reserve space to accommodate other optical elements. The following condition may be satisfied: 0.1≤EBL/BL≤1.5.

The optical image capturing system may further include a light filtering element. The light filtering element is located between the fourth lens element and the image plane. A distance paralleling the optical axis from a coordinate point on the image-side surface of the fourth lens element at height of ½ HEP to the light filtering element is EIR. A distance paralleling the optical axis from an axial point on the image-side surface of the fourth lens element to the light filtering element is PIR. The embodiments of the present invention may satisfy the following condition: 0.1≤EIR/PIR≤1.1.

The optical image capturing system described above may be configured to form the image on the image sensing device which is shorter than 1/1.2 inch in diagonal length. The pixel size of the image sensing device is smaller than 1.4 micrometers (μm). Preferably the pixel size thereof is smaller than 1.12 micrometers (μm). The best pixel size thereof is smaller than 0.9 micrometers (μm). Furthermore, the optical image capturing system is applicable to the image sensing device with aspect ratio of 16:9.

The optical image capturing system described above is applicable to the demand of video recording with above millions or ten millions-pixels (e.g. 4K and 2K videos or the so-called UHD and QHD) and leads to a good imaging quality.

The height of optical system (HOS) may be reduced to achieve the minimization of the optical image capturing system when the absolute value of f1 is larger than f1 (|f1|>f4).

When the relationship |f2|+|f3|>|f1|+|f4| is satisfied, at least one of the second through third lens elements may have weak positive refractive power or weak negative refractive power. The weak refractive power indicates that an absolute value of the focal length of a specific lens element is greater than 10. When at least one of the second through third lens elements has the weak positive refractive power, the positive refractive power of the first lens element can be shared, such that the unnecessary aberration will not appear too early. On the contrary, when at least one of the second and third lens elements has the weak negative refractive power, the aberration of the optical image capturing system can be corrected and fine-tuned.

The fourth lens element may have negative refractive power, and the image-side surface thereof may be a concave surface. With this configuration, the back focal distance of the optical image capturing system may be shortened and the system may be minimized. Besides, at least one surface of the fourth lens element may possess at least one inflection point, which is capable of effectively reducing the incident angle of the off-axis rays of the field of view, thereby further correcting the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DESCRIPTION OF THE PREFERRED EMBODIMENTS

Figure 1A:
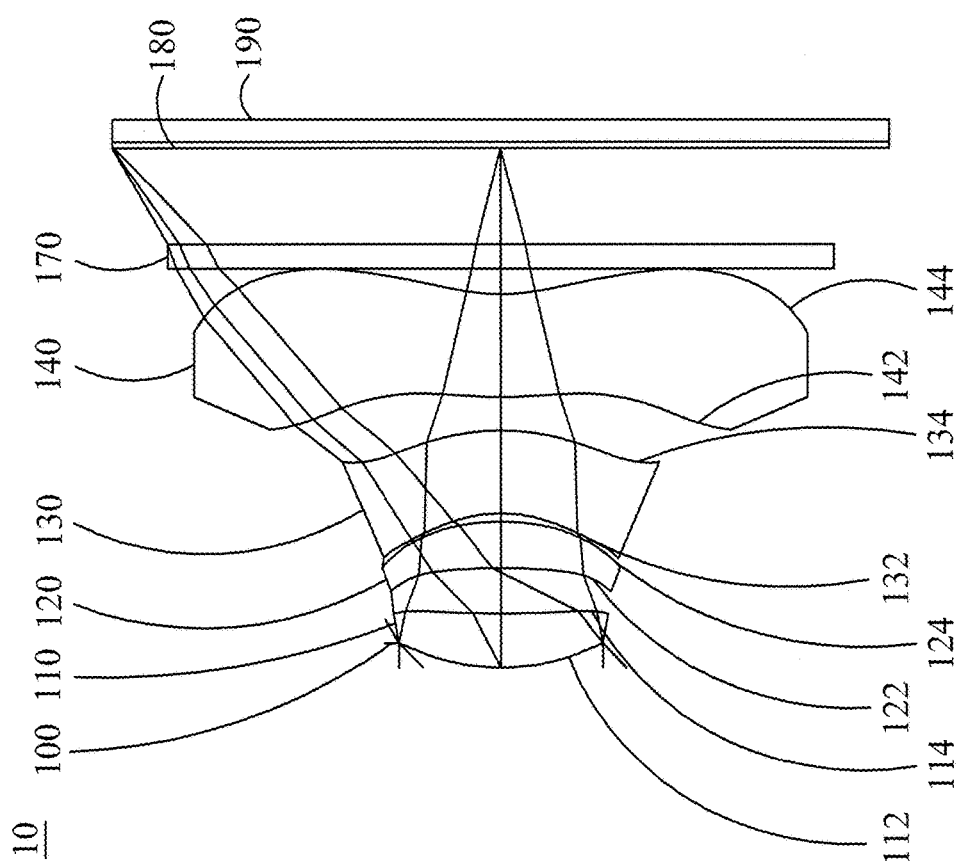
FIG. 1A is a schematic view of the optical image capturing system according to the first embodiment of the present invention.

An optical image capturing system, in the order from an object side to an image side, includes a first, second, third and fourth lens elements with refractive power and an image plane. The optical image capturing system may further include an image sensing device which is disposed on an image plane.

The optical image capturing system may use three sets of operation wavelengths, which are 486.1 nm, 587.5 nm and 656.2 nm, respectively, wherein 587.5 nm is served as the primary reference wavelength and a reference wavelength to obtain technical features of the optical system. The optical image capturing system may also use five sets of wavelengths which are 470 nm, 510 nm, 555 nm, 610 nm and 650 nm, respectively, wherein 555 nm is served as the primary reference wavelength and a reference wavelength to obtain technical features of the optical system.

A ratio of the focal length f of the optical image capturing system to a focal length fp of each lens element with positive refractive power is PPR. A ratio of the focal length f of the optical image capturing system to a focal length fn of each lens element with negative refractive power is NPR. A sum of the PPR of all lens elements with positive refractive powers is ΣPPR. A sum of the NPR of all lens elements with negative refractive powers is ΣNPR. The total refractive power and the total length of the optical image capturing system can be controlled easily when following conditions are satisfied: 0.5≤ΣPPR/|ΣNPR|≤4.5. Preferably, the following condition may be satisfied: 1≤ΣPPR/|ΣNPR|≤3.5.

The height of the optical image capturing system is HOS. When the value of the ratio, i.e. HOS/f approaches 1, it would be easier to manufacture the miniaturized optical image capturing system capable of ultra-high pixel image fat nation.

A sum of a focal length fp of each lens element with positive refractive power is ΣPP. A sum of a focal length fn of each lens element with negative refractive power is ΣNP. In one embodiment of the optical image capturing system of the present disclosure, the following conditions are satisfied: 0<ΣPP≤200 and f1/ΣPP≤0.85. Preferably, the following relations may be satisfied: 0<ΣPP≤150 and 0.01≤f1/ΣPP≤0.7. As a result, the optical image capturing system will have better control over the focusing, and the positive refractive power of the optical system can be distributed appropriately, so as to suppress any premature formation of noticeable aberration.

The first lens element may have positive refractive power, and it has a convex object-side surface. Hereby, the magnitude of the positive refractive power of the first lens element can be fined-tuned, so as to reduce the total length of the optical image capturing system.

The second lens element may have negative refractive power. Hereby, the aberration generated by the first lens element can be corrected.

The third lens element may have positive refractive power. Hereby, the positive refractive power of the first lens element can be shared.

The fourth lens element may have negative refractive power and a concave image-side surface. With this configuration, the back focal length is reduced in order to keep the size of the optical system small. In addition, at least one of the object-side surface and the image-side surface of the fourth lens element may have at least one inflection point, which is capable of effectively reducing the incident angle of the off-axis rays of the field of view, thereby further correcting the off-axis aberration. Preferably, each of the object-side surface and the image-side surface may have at least one inflection point.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following conditions are satisfied: $HOS/HOI \leq 3$ and $0.5 \leq HOS/f \leq 3.0$. Preferably, the following relations may be satisfied: $1 \leq HOS/HOI \leq 2.5$ and $1 \leq HOS/f \leq 2$. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following condition is satisfied: $0.55 \leq InS/HOS \leq 1.1$. Preferably, the following relation may be satisfied: $0.8 \leq InS/HOS \leq 1$. Hereby, features of maintaining the minimization for the optical image capturing system and having wide-angle are available simultaneously.

In the optical image capturing system of the disclosure, a distance from the object-side surface of the first lens element to the image-side surface of the fourth lens element is InTL. A sum of central thicknesses of all lens elements with refractive power on the optical axis is $\Sigma TP$. The following condition is satisfied: $0.45 \leq \Sigma TP/InTL \leq 0.95$. Preferably, the following relation may be satisfied: $0.6 \leq \Sigma TP/InTL \leq 0.9$. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following condition is satisfied: $0.01 \leq |R1/R2| \leq 0.5$. Hereby, the first lens element may have a suitable magnitude of positive refractive power, so as to avoid the longitudinal spherical aberration to increase too fast. Preferably, the following relation may be satisfied: $0.01 \leq |R1/R2| \leq 0.4$.

A curvature radius of the object-side surface of the fourth lens element is R9. A curvature radius of the image-side surface of the fourth lens element is R10. The following condition is satisfied: $-200 < (R7-R8)/(R7+R8) < 30$. Hereby, the astigmatism generated by the optical image capturing system can be corrected beneficially.

A distance between the first lens element and the second lens element on the optical axis is IN12. The following condition is satisfied: $0 < IN12/f \leq 0.25$. Preferably, the following relation may be satisfied: $0.01 \leq IN12/f \leq 0.20$. Hereby, the chromatic aberration of the lens elements can be improved, such that the performance can be increased.

A distance between the second lens element and the third lens element on the optical axis is IN23. The following condition is satisfied: $0 < IN23/f \leq 0.25$. Preferably, the following relation may be satisfied: $0.01 \leq IN23/f \leq 0.20$. Hereby, the performance of the lens elements can be improved.

A distance between the third lens element and the fourth lens element on the optical axis is IN34. The following condition is satisfied: $0 < IN34/f \leq 0.25$. Preferably, the following relation may be satisfied: $0.001 \leq IN34/f \leq 0.20$. Hereby, the performance of the lens elements can be improved.

Central thicknesses of the first lens element and the second lens element on the optical axis are TP1 and TP2, respectively. The following condition is satisfied: $1 \leq (TP1+IN12)/TP2 \leq 10$. Hereby, the sensitivity of the optical image capturing system can be controlled, and the performance can be increased.

Central thicknesses of the third lens element and the fourth lens element on the optical axis are TP3 and TP4, respectively, and a distance between the aforementioned two lens elements on the optical axis is IN34. The following condition is satisfied: $0.2 \leq (TP4+IN34)/TP4 \leq 3$. Hereby, the sensitivity of the optical image capturing system can be controlled and the total height of the optical image capturing system can be reduced.

A distance between the second lens element and the third lens element on the optical axis is IN23. A total sum of distances from the first lens element to the fourth lens element on the optical axis is ETP. The following condition is satisfied: $0.01 \leq IN23/(TP2+IN23+TP3) \leq 0.5$. Preferably, the following relation may be satisfied: $0.05 \leq IN23/(TP2+IN23+TP3) \leq 0.4$. Hereby, the aberration generated when the incident light is travelling inside the optical system can be corrected slightly layer upon layer, and the total height of the optical image capturing system can be reduced.

In the optical image capturing system of the disclosure, a distance paralleling an optical axis from a maximum effective diameter position to an axial point on the object-side surface 142 of the fourth lens element is InRS41 (InRS41 is positive if the horizontal displacement is toward the image-side surface, or InRS41 is negative if the horizontal displacement is toward the object-side surface). A distance paralleling an optical axis from a maximum effective diameter position to an axial point on the image-side surface 144 of the fourth lens element is InRS42. A central thickness of the fourth lens element 140 on the optical axis is TP4. The following conditions are satisfied: −1 mm≤InRS41≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hereby, the maximum effective diameter position between both surfaces of the fourth lens element can be controlled, so as to facilitate the aberration correction of peripheral field of view of the optical image capturing system and maintain its miniaturization effectively.

In the optical image capturing system of the disclosure, a distance paralleling an optical axis from an inflection point on the object-side surface of the fourth lens element which is nearest to the optical axis to an axial point on the object-side surface of the fourth lens element is denoted by SGI411. A distance paralleling an optical axis from an inflection point on the image-side surface of the fourth lens element which is nearest to the optical axis to an axial point on the image-side surface of the fourth lens element is denoted by SGI421. The following conditions are satisfied: 0<SGI411/(SGI411+TP4)≤0.9 and 0<SGI421/(SGI421+TP4)≤0.9. Preferably, the following relations may be satisfied: 0.01<SGI411/(SGI411+TP4)≤0.7 and 0.01<SGI421/(SGI421+TP4)≤0.7.

A distance paralleling the optical axis from the inflection point on the object-side surface of the fourth lens element which is the second nearest to the optical axis to an axial point on the object-side surface of the fourth lens element is denoted by SGI412. A distance paralleling an optical axis from an inflection point on the image-side surface of the fourth lens element which is the second nearest to the optical axis to an axial point on the image-side surface of the fourth lens element is denoted by SGI422. The following conditions are satisfied: 0<SGI412/(SGI412+TP4)≤0.9 and 0<SGI422/(SGI422+TP4)≤0.9. Preferably, the following relations may be satisfied: 0.1≤SGI412/(SGI412+TP4)≤0.8 and 0.1≤SGI422/(SGI422+TP4)≤0.8.

A distance perpendicular to the optical axis between the inflection point on the object-side surface of the fourth lens element which is nearest to the optical axis and the optical axis is denoted by HIF411. A distance perpendicular to the optical axis between an inflection point on the image-side surface of the fourth lens element which is nearest to the optical axis and an axial point on the image-side surface of the fourth lens element is denoted by HIF421. The following conditions are satisfied: 0.01≤HIF411/HOI≤0.9 and 0.01≤HIF421/HOI≤0.9. Preferably, the following relations may be satisfied: 0.09≤HIF411/HOI≤0.5 and 0.09≤HIF421/HOI≤0.5.

A distance perpendicular to the optical axis between the inflection point on the object-side surface of the fourth lens element which is the second nearest to the optical axis and the optical axis is denoted by HIF412. A distance perpendicular to the optical axis between an axial point on the image-side surface of the fourth lens element and an inflection point on the image-side surface of the fourth lens element which is the second nearest to the optical axis is denoted by HIF422. The following conditions are satisfied: 0.01≤HIF412/HOI≤0.9 and 0.01≤HIF422/HOI≤0.9. Preferably, the following relations may be satisfied: 0.09≤HIF412/HOI≤0.8 and 0.09≤HIF422/HOI≤0.8.

A distance perpendicular to the optical axis between the inflection point on the object-side surface of the fourth lens element which is the third nearest to the optical axis and the optical axis is denoted by HIF413. A distance perpendicular to the optical axis between an axial point on the image-side surface of the fourth lens element and an inflection point on the image-side surface of the fourth lens element which is the third nearest to the optical axis is denoted by HIF423. The following conditions are satisfied: 0.001 mm≤|HIF413|≤5 mm and 0.001 mm≤|HIF423|≤5 mm Preferably, the following relations may be satisfied: 0.1 mm≤|HIF423|≤3.5 mm and 0.1 mm≤|HIF413|≤3.5 mm.

A distance perpendicular to the optical axis between the inflection point on the object-side surface of the fourth lens element which is the fourth nearest to the optical axis and the optical axis is denoted by HIF414. A distance perpendicular to the optical axis between an axial point on the image-side surface of the fourth lens element and an inflection point on the image-side surface of the fourth lens element which is the fourth nearest to the optical axis is denoted by HIF424. The following conditions are satisfied: 0.001 mm≤|HIF414|≤5 mm and 0.001 mm≤|HIF424|≤5 mm. Preferably, the following relations may be satisfied: 0.1 mm≤|HIF424|≤3.5 mm and 0.1 mm≤|HIF414|≤3.5 mm.

In one embodiment of the optical image capturing system of the present disclosure, the chromatic aberration of the optical image capturing system can be corrected by alternatively arranging the lens elements with large Abbe number and small Abbe number.

The equation for the aforementioned aspheric surface is:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

The optical image capturing system provided by the disclosure, the lens elements may be made of glass or plastic material. If plastic material is adopted to produce the lens elements, the cost of manufacturing as well as the weight of the lens element can be reduced effectively. If lens elements are made of glass, the heat effect can be controlled and the room of adjustment of the refractive power of the optical image capturing system can be increased. Besides, the object-side surface and the image-side surface of the first through fourth lens elements may be aspheric, which provides more control variables, such that the number of lens elements used can be reduced in contrast to traditional glass lens element, and the aberration can be reduced too. Thus, the total height of the optical image capturing system can be reduced effectively.

In addition, in the optical image capturing system provided by the disclosure, if the lens element has a convex surface, the surface of the lens element adjacent to the optical axis is convex. If the lens element has a concave surface, the surface of the lens element adjacent to the optical axis is concave.

Besides, in the optical image capturing system of the disclosure, according to different requirements, at least one aperture stop may be arranged for reducing stray light and improving the imaging quality.

The optical image capturing system of the disclosure can be adapted to the optical image capturing system with automatic focus if required. With the features of a good aberration correction and a high quality of image formation, the optical image capturing system can be used in various applications.

The optical image capturing system of the disclosure can include a driving module according to the actual requirements. The driving module may be coupled with the lens elements and enables the movement of the lens elements.

The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens element among the first lens element, the second lens element, the third lens element and the fourth lens element of the optical image capturing system of the present disclosure may be a light filtering element which has a wavelength less than 500 nm according to the actual requirements. The light filtering element may be made by coating film on at least one surface of the lens element with the specific filtration function or the lens element per se is designed with the material which is able to filter the short wavelength.

The image plane of the optical image capturing system of the present disclosure may be a plane or a curved surface, depending on the design requirement. When the image plane is a curved surface (e.g. a spherical surface with curvature radius), the incident angle required such that the rays are focused on the image plane can be reduced. As such, the length of the optical image capturing system (TTL) can be minimized, and the relative illumination may be improved as well.

According to the above embodiments, the specific embodiments with figures are presented in detail as below.

The First Embodiment

Figure 1B:
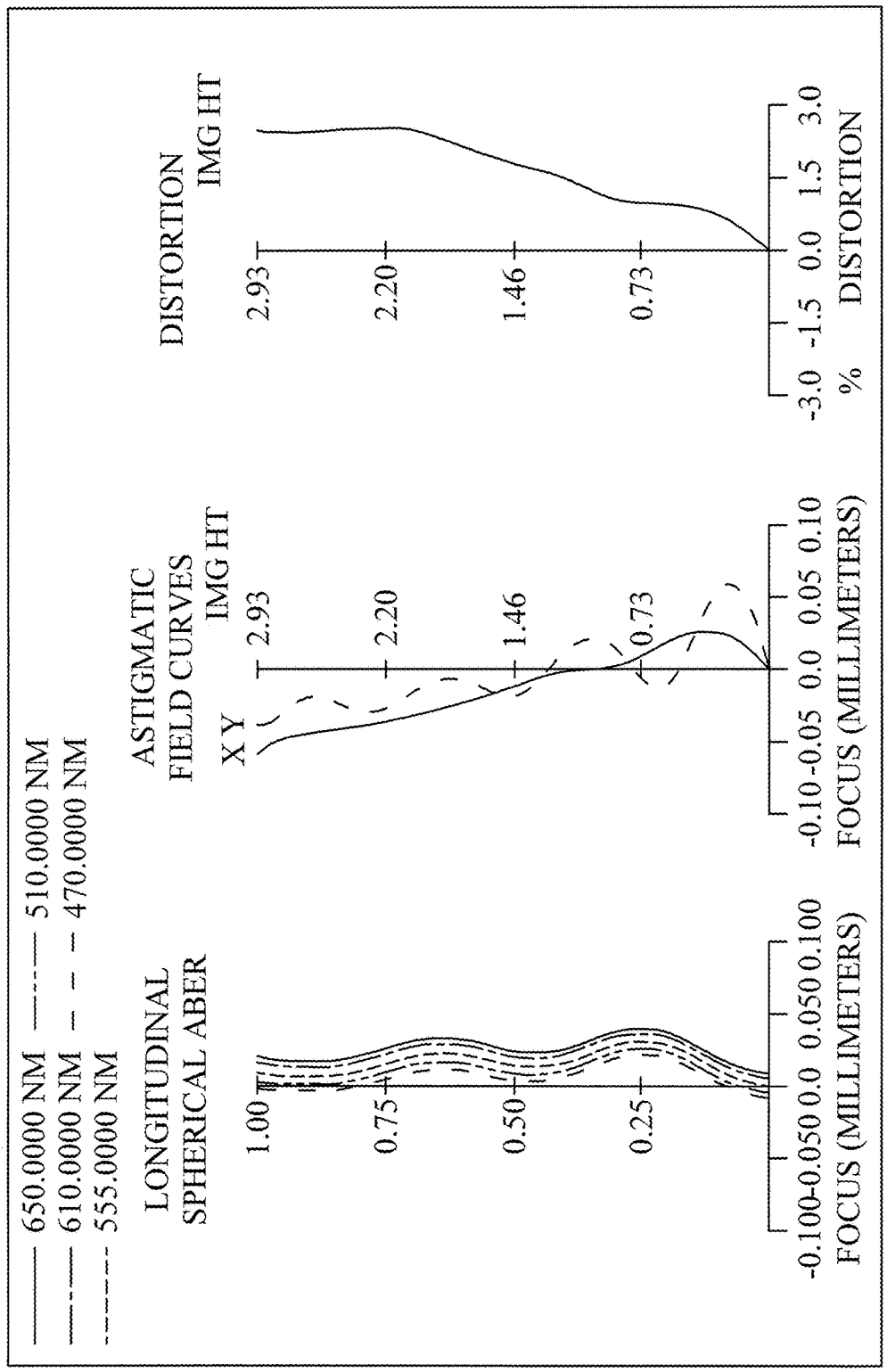
FIG. 1B shows the longitudinal spherical aberration curves, astigmatic field curves, and an optical distortion grid of the optical image capturing system in the order from left to right according to the first embodiment of the present invention.
Figure 1C:
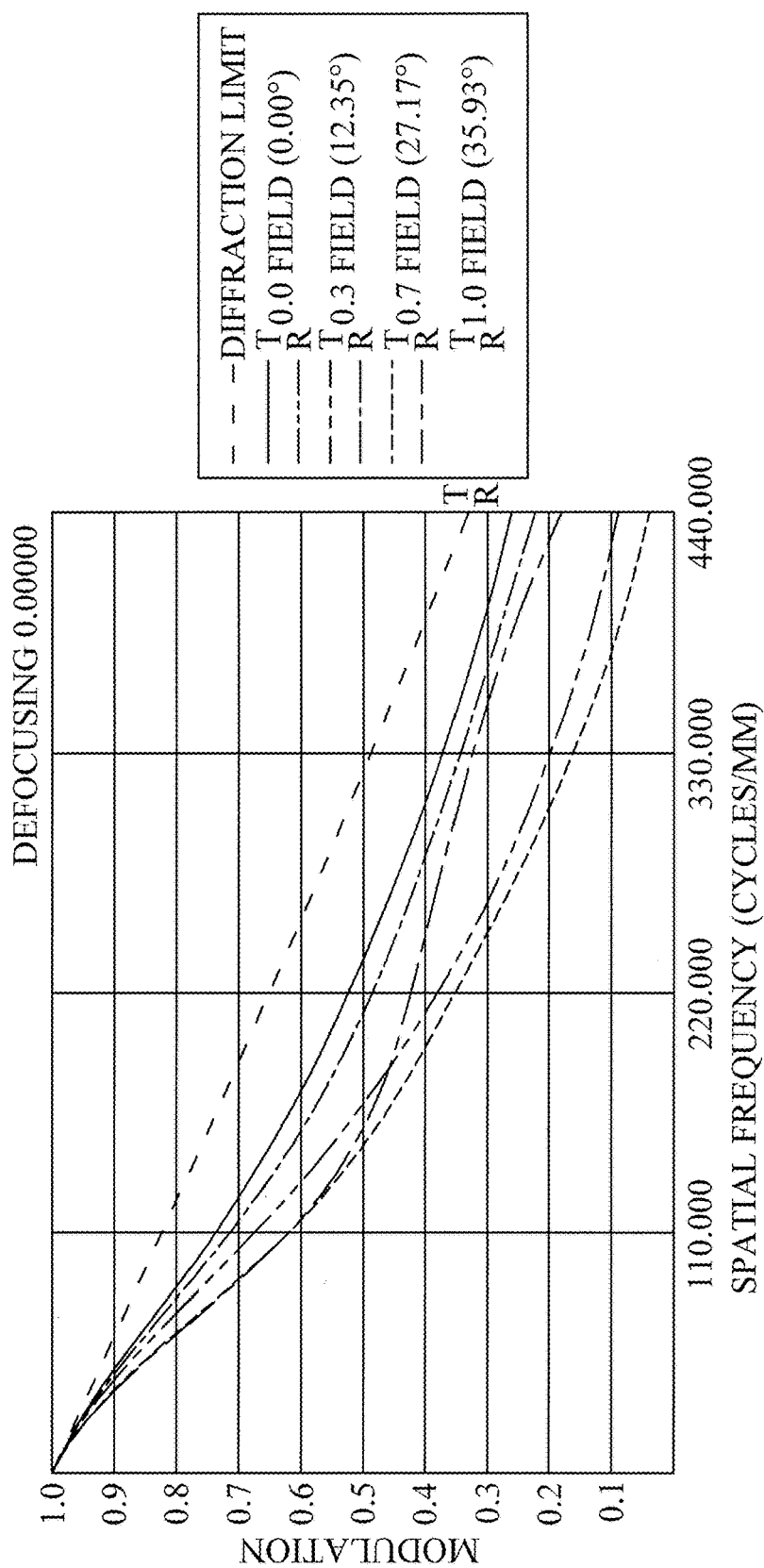
FIG. 1C is a characteristic diagram of modulation transfer of visible light spectrum for the optical image capturing system according to the first embodiment of the present invention.

Please refer to FIG. 1A to FIG. 1C. FIG. 1A is a schematic view of the optical image capturing system according to the first embodiment of the present invention. FIG. 1B shows the longitudinal spherical aberration curves, astigmatic field curves, and an optical distortion grid of the optical image capturing system in the order from left to right according to the first embodiment of the present invention. FIG. 1C is a characteristic diagram of modulation transfer of visible light for the optical image capturing system of the first embodiment of the present invention. As shown in FIG. 1A, in the order from an object side to an image side, the optical image capturing system includes an aperture stop 100, a first lens element 110, a second lens element 120, a third lens element 130, a fourth lens element 140, an IR-bandstop filter 170, an image plane 180, and an image sensing device 190.

The first lens element 110 has positive refractive power and it is made of plastic material. The first lens element 110 has a convex object-side surface 112 and a concave image-side surface 114, and both of the object-side surface 112 and the image-side surface 114 are aspheric and have an inflection point. The central thickness of the first lens element on the optical axis is TP1 while the thickness paralleling the optical axis of the first lens element at height of ½ entrance pupil diameter (HEP) is ETP1.

A distance paralleling an optical axis from an inflection point on the object-side surface of the first lens element which is nearest to the optical axis to an axial point on the object-side surface of the first lens element is denoted by SGI111. A distance paralleling an optical axis from an inflection point on the image-side surface of the first lens element which is nearest to the optical axis to an axial point on the image-side surface of the first lens element is denoted by SGI121. The following conditions are satisfied: SGI111=0.2008 mm, SGI121=0.0113 mm, |SGI111|/(|SGI111|+TP1)=0.3018 and |SGI121|/(|SGI121|+TP1)=0.0238.

A distance perpendicular to the optical axis from the inflection point on the object-side surface of the first lens element which is nearest to the optical axis to an axial point on the object-side surface of the first lens element is denoted by HIF111. A distance perpendicular to the optical axis from the inflection point on the image-side surface of the first lens element which is nearest to the optical axis to an axial point on the image-side surface of the first lens element is denoted by HIF121. The following conditions are satisfied: HIF111=0.7488 mm, HIF121=0.4451 mm, HIF111/HOI=0.2552 and HIF121/HOI=0.1517.

The second lens element 120 has positive refractive power and it is made of plastic material. The second lens element 120 has a concave object-side surface 122 and a convex image-side surface 124, and both of the object-side surface 122 and the image-side surface 124 are aspheric. The object-side surface 122 has an inflection point. The central thickness of the second lens element on the optical axis is TP2 while the thickness paralleling the optical axis of the second lens element at height of ½ entrance pupil diameter (HEP) is ETP2.

A distance paralleling an optical axis from an inflection point on the object-side surface of the second lens element which is nearest to the optical axis to an axial point on the object-side surface of the second lens element is denoted by SGI211. A distance paralleling an optical axis from an inflection point on the image-side surface of the second lens element which is nearest to the optical axis to an axial point on the image-side surface of the second lens element is denoted by SGI221. The following conditions are satisfied: SGI211=−0.1791 mm and |SGI211|/(|SGI211|+TP2)=0.3109.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following conditions are satisfied: HIF211=0.8147 mm and HIF211/HOI=0.2777.

The third lens element 130 has negative refractive power and it is made of plastic material. The third lens element 130 has a concave object-side surface 132 and a convex image-side surface 134, and both of the object-side surface 132 and the image-side surface 134 are aspheric. The image-side surface 134 has an inflection point. The central thickness of the third lens element on the optical axis is TP3 while the thickness paralleling the optical axis of the third lens element at height of ½ entrance pupil diameter (HEP) is ETP3.

A distance paralleling an optical axis from an inflection point on the object-side surface of the third lens element which is nearest to the optical axis to an axial point on the object-side surface of the third lens element is denoted by SGI311. A distance paralleling an optical axis from an inflection point on the image-side surface of the third lens element which is nearest to the optical axis to an axial point on the image-side surface of the third lens element is denoted by SGI321. The following relationship are satisfied: SGI321=−0.1647 mm; |SGI321|/(|SGI321|+TP3)=0.1884.

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following conditions are satisfied: HIF321=0.7269 mm and HIF321/HOI=0.2477.

The fourth lens element 140 has negative refractive power and it is made of plastic material. The fourth lens element 140 has a convex object-side surface 142 and a concave image-side surface 144; both of the object-side surface 142 and the image-side surface 144 are aspheric. The object-side surface 142 thereof has two inflection points while the image-side surface 144 thereof has an inflection point. The central thickness of the fourth lens element on the optical axis is TP4 while the thickness paralleling the optical axis of the fourth lens element at height of ½ entrance pupil diameter (HEP) is ETP4.

A distance paralleling an optical axis from an inflection point on the object-side surface of the fourth lens element which is nearest to the optical axis to an axial point on the object-side surface of the fourth lens element is denoted by SGI411. A distance paralleling an optical axis from an inflection point on the image-side surface of the fourth lens element which is nearest to the optical axis to an axial point on the image-side surface of the fourth lens element is denoted by SGI421. The following conditions are satisfied: SGI411=0.0137 mm, SGI421=−0.0922 mm, |SGI411|/(|SGI411|+TP4)=0.0155 and |SGI421|/(|SGI421|+TP4)=0.0956.

A distance paralleling an optical axis from an inflection point on the object-side surface of the fourth lens element which is the second nearest to the optical axis to an axial point on the object-side surface of the fourth lens element is denoted by SGI412. The following conditions are satisfied: SGI412=−0.1518 mm and |SGI412|/(|SGI412|+TP4)=0.1482.

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following conditions are satisfied: HIF411=0.2890 mm, HIF421=0.5794 mm, HIF411/HOI=0.0985 and HIF421/HOI=0.1975.

A distance perpendicular to the optical axis between the inflection point on the object-side surface of the fourth lens element which is second nearest to the optical axis and the optical axis is denoted by HIF412. The following conditions are satisfied: HIF412=1.3328 mm and HIF412/HOI=0.4543.

The IR-bandstop filter 170 is made of glass material and is disposed between the fourth lens element 140 and the image plane 180 without affecting the focal length of the optical image capturing system.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=3.4375 mm, f/HEP=2.23, HAF=39.69° and tan(HAF)=0.8299.

In the optical image capturing system of the first embodiment, a focal length of the first lens element 110 is f1 and a focal length of the fourth lens element 140 is f4. The following conditions are satisfied: f1=3.2736 mm, |f/f1|=1.0501, f4=−8.3381 mm and |f1/f4|=0.3926.

In the optical image capturing system of the first embodiment, a focal length of the second lens element 120 is f2 and a focal length of the third lens element 130 is f3. The following conditions are satisfied: |f2|+|f3|=10.0976 mm, |f1|+|f4|=11.6116 mm and |f2|+|f3|<|f1|+|f4|.

A ratio of the focal length f of the optical image capturing system to a focal length fp of each of lens elements with positive refractive powers is PPR. A ratio of the focal length f of the optical image capturing system to a focal length fn of each of lens elements with negative refractive powers is NPR. In the optical image capturing system of the first embodiment, a sum of the PPR of all lens elements with positive refractive powers is ΣPPR=|f/f1|+|f/f2|=1.95585. A sum of the NPR of all lens elements with negative refractive powers is ΣNPR=|f/f3|+|f/f4|=0.95770, ΣPPR/|ΣNPR|=2.04224. The following conditions are also satisfied: |f/f1|=1.05009, |f/f2|=0.90576, |f/f3|=0.54543 and |f/f4|=0.41227.

In the optical image capturing system of the first embodiment, a distance from the object-side surface 112 of the first lens element to the image-side surface 144 of the fourth lens element is InTL. A distance from the object-side surface 112 of the first lens element to the image plane 180 is HOS. A distance from an aperture 100 to an image plane 180 is InS. Half of a diagonal length of an effective detection field of the image sensing device 190 is HOI. A distance from the image-side surface 144 of the fourth lens element to an image plane 180 is InB. The following conditions are satisfied: InTL+InB=HOS, HOS=4.4250 mm, HOI=2.9340 mm, HOS/HOI=1.5082, HOS/f=1.2873, InTL/HOS=0.7191, InS=4.2128 mm and InS/HOS=0.95204.

In the optical image capturing system of the first embodiment, the sum of central thicknesses of all lens elements with refractive power on the optical axis is ΣTP. The following conditions are satisfied: ΣTP=2.4437 mm and ΣTP/InTL=0.76793. Therefore, both contrast ratio for the image formation in the optical image capturing system and yield rate of the manufacturing process of the lens element can be balanced, and a proper back focal length is provided to dispose other optical components in the optical image capturing system.

In the optical image capturing system of the first embodiment, a curvature radius of the object-side surface 112 of the first lens element is R1. A curvature radius of the image-side surface 114 of the first lens element is R2. The following condition is satisfied: |R1/R2|=0.1853. Hereby, the first lens element has a suitable magnitude of the positive refractive power, so as to prevent the spherical aberration from increasing too fast.

In the optical image capturing system of the first embodiment, a curvature radius of the object-side surface 142 of the fourth lens element is R7. A curvature radius of the image-side surface 144 of the fourth lens element is R8. The following condition is satisfied: (R7−R8)/(R7+R8)=0.2756. As such, the astigmatism generated by the optical image capturing system can be corrected.

In the optical image capturing system of the first embodiment, the focal lengths for the first lens element 110 and the second lens element 120 are respectively f1 and f2. The sum of the focal lengths for all lens elements having positive refractive power is ΣPP, which satisfies the following conditions: ΣPP=f1+f2=7.0688 mm and f1/(f1+f2)=0.4631. Therefore, the positive refractive power of the first lens element 110 may be distributed to other lens elements with positive refractive power appropriately, so as to suppress noticeable aberrations generated when the incident light is tracing along the optical system.

In the optical image capturing system of the first embodiment, the focal lengths for the third lens element 130 and the fourth lens element 140 are respectively f3 and f4. The sum of the focal lengths for all lens elements having negative refractive power is ΣNP, which satisfies the following conditions: ΣNP=f3+f4=−14.6405 mm and f4/(f2+f4)=0.5695. Therefore, the negative refractive power of the fourth lens element may be distributed to other lens elements with negative refractive power appropriately, so as to suppress noticeable aberrations generated when the incident light is tracing along the optical system.

In the optical image capturing system of the first embodiment, a distance between the first lens element 110 and the second lens element 120 on the optical axis is IN12. The following conditions are satisfied: IN12=0.3817 mm and IN12/f=0.11105. Hereby, the chromatic aberration of the lens elements can be improved, such that the performance of the optical system is increased.

In the optical image capturing system of the first embodiment, a distance between the second lens element 120 and the third lens element 130 on the optical axis is IN23. The following conditions are satisfied: IN23=0.0704 mm and IN23/f=0.02048. Hereby, the chromatic aberration of the lens elements can be improved, such that the performance of the optical system is increased.

In the optical image capturing system of the first embodiment, a distance between the third lens element 130 and the fourth lens element 140 on the optical axis is IN34. The following conditions are satisfied: IN34=0.2863 mm and IN34/f=0.08330. Hereby, the chromatic aberration of the lens elements can be improved, such that the performance of the optical system is increased.

In the optical image capturing system of the first embodiment, central thicknesses of the first lens element 110 and the second lens element 120 on the optical axis are TP1 and TP2, respectively. The following conditions are satisfied: TP1=0.46442 mm, TP2=0.39686 mm, TP1/TP2=1.17023 and (TP1+IN12)/TP2=2.13213. Hereby, the sensitivity of the optical image capturing system can be controlled, and the performance thereof can be increased.

In the optical image capturing system of the first embodiment, central thicknesses of the third lens element 130 and the fourth lens element 140 on the optical axis are TP3 and TP4, respectively. The separation distance between the third lens element 130 and the fourth lens element 140 on the optical axis is IN34. The following conditions are satisfied: TP3=0.70989 mm, TP4=0.87253 mm, TP3/TP4=0.81359 and (TP4+IN34)/TP3=1.63248. Hereby, the sensitivity of the optical image capturing system can be controlled, and the performance thereof can be increased.

In the optical image capturing system of the first embodiment, the following relations are satisfied: IN23/(TP2+IN23+TP3)=0.05980. Hereby, the aberration generated when the incident light is travelling inside the optical system can be corrected slightly layer upon layer, and the total height of the optical image capturing system can be reduced.

In the optical image capturing system of the first embodiment, a distance paralleling an optical axis from a maximum effective diameter position to an axial point on the object-side surface 142 of the fourth lens element is InRS41. A distance paralleling an optical axis from a maximum effective diameter position to an axial point on the image-side surface 144 of the fourth lens element is InRS42. A central thickness of the fourth lens element 140 is TP4. The following conditions are satisfied: InRS41=−0.23761 mm, InRS42=−0.20206 mm, |InRS41|+|InRS42|=0.43967 mm, |InRS41|/TP4=0.27232 and |InRS42|/TP4=0.23158. Hereby, it is favorable to the manufacturing and forming of the lens element, while maintaining the minimization for the optical image capturing system.

In the optical image capturing system of the first embodiment, a distance perpendicular to the optical axis between a critical point C41 on the object-side surface 142 of the fourth lens element and the optical axis is HVT41. A distance perpendicular to the optical axis between a critical point C42 on the image-side surface 144 of the fourth lens element and the optical axis is HVT42. The following conditions are satisfied: HVT41=0.5695 mm, HVT42=1.3556 mm and HVT41/HVT42=0.4201. With this configuration, the off-axis aberration could be corrected effectively.

In the optical image capturing system of the first embodiment, the following condition is satisfied: HVT42/HOI=0.4620. As such, the aberration at the surrounding field of view of the optical image capturing system may be corrected effectively.

In the optical image capturing system of the first embodiment, the following condition is satisfied: HVT42/HOS=0.3063. As such, the aberration at the surrounding field of view of the optical image capturing system may be corrected effectively.

In the optical image capturing system of the first embodiment, the Abbe number of the first lens element is NA1. The Abbe number of the second lens element is NA2. The Abbe number of the third lens element is NA3. The Abbe number of the fourth lens element is NA4. The following conditions are satisfied: |NA1−NA2|=0 and NA3/NA2=0.39921. Hereby, the chromatic aberration of the optical image capturing system can be corrected.

In the optical image capturing system of the first embodiment, TV distortion and optical distortion for image formation in the optical image capturing system are TDT and ODT, respectively. The following conditions are satisfied: |TDT|=0.4% and |ODT|=2.5%.

In the optical image capturing system of the present embodiment, the modulation transfer rates (values of MTF) of half frequency at positions of the optical axis, 0.3 HOI and 0.7 HOI on the image plane are respectively denoted by MTFH0, MTFH3 and MTFH7. The following conditions are satisfied: MTFH0 is about 0.525, MTFH3 is about 0.375, and MTFH7 is about 0.35.

Table 1 and Table 2 below should be incorporated into the reference of the present embodiment.

TABLE 1

Lens Parameters for the First Embodiment
f(focal length) = 3.4375 mm; f/HEP = 2.23; HAF(half angle view) = 39.6900 deg;
tan(HAF) = 0.8299

| Surface No. | | Curvature Radius | Central Thickness | Material | Refractive Index | Abbe Number | Focal Length |
|---|---|---|---|---|---|---|---|
| 0 | Object | Plane | ∞ | | | | |
| 1 | Lens 1/ Aperture stop | 1.466388 | 0.464000 | Plastic | 1.535 | 56.07 | 3.274 |

TABLE 1-continued

Lens Parameters for the First Embodiment
f(focal length) = 3.4375 mm; f/HEP = 2.23; HAF(half angle view) = 39.6900 deg;
tan(HAF) = 0.8299

| Surface No. | | Curvature Radius | Central Thickness | Material | Refractive Index | Abbe Number | Focal Length |
|---|---|---|---|---|---|---|---|
| 2 | | 7.914480 | 0.382000 | | | | |
| 3 | Lens 2 | −5.940659 | 0.397000 | Plastic | 1.535 | 56.07 | 3.795 |
| 4 | | −1.551401 | 0.070000 | | | | |
| 5 | Lens 3 | −0.994576 | 0.710000 | Plastic | 1.642 | 22.46 | −6.302 |
| 6 | | −1.683933 | 0.286000 | | | | |
| 7 | Lens 4 | 2.406736 | 0.873000 | Plastic | 1.535 | 56.07 | −8.338 |
| 8 | | 1.366640 | 0.213000 | | | | |
| 9 | IR-bandstop filter | Plane | 0.210000 | BK7_SCHOTT | 1.517 | 64.13 | |
| 10 | | Plane | 0.820000 | | | | |
| 11 | Image plane | Plane | | | | | |

Reference wavelength (d-line) = 555 nm; Shield Position: The $8^{th}$ surface with clear aperture of 2.320 mm

TABLE 2

Aspheric Coefficients of the First Embodiment
Aspheric Coefficients

| Surface No. | 1 | 2 | 3 | 4 |
|---|---|---|---|---|
| k= | −1.595426E+00 | −7.056632E+00 | −2.820679E+01 | −1.885740E+00 |
| $A_4$= | −4.325520E−04 | −2.633963E−02 | −1.367865E−01 | −9.745260E−02 |
| $A_6$= | 1.103749E+00 | 2.088207E−02 | 3.135755E−01 | −1.032177E+00 |
| $A_8$= | −8.796867E+00 | −1.122861E−01 | −6.149514E+00 | 8.016230E+00 |
| $A_{10}$= | 3.981982E+01 | −7.137813E−01 | 3.883332E+01 | −4.215882E+01 |
| $A_{12}$= | −1.102573E+02 | 2.236312E+00 | −1.463622E+02 | 1.282874E+02 |
| $A_{14}$= | 1.900642E+02 | −2.756305E+00 | 3.339863E+02 | −2.229568E+02 |
| $A_{16}$= | −2.000279E+02 | 1.557080E+00 | −4.566510E+02 | 2.185571E+02 |
| $A_{18}$= | 1.179848E+02 | −2.060190E+00 | 3.436469E+02 | −1.124538E+02 |
| $A_{20}$= | −3.023405E+01 | 2.029630E+00 | −1.084572E+02 | 2.357571E+01 |

| Surface No. | 5 | 6 | 7 | 8 |
|---|---|---|---|---|
| k= | 1.013988E−01 | −3.460337E+01 | −4.860907E+01 | −7.091499E+00 |
| $A_4$= | 2.504976E−01 | −9.580611E−01 | −2.043197E−01 | −8.148585E−02 |
| $A_6$= | −1.640463E+00 | 3.303418E+00 | 6.516636E−02 | 3.050566E−02 |
| $A_8$= | 1.354700E+01 | −8.544412E+00 | 4.863926E−02 | −8.218175E−03 |
| $A_{10}$= | −6.223343E+01 | 1.602487E+01 | −7.086809E−02 | 1.186528E−03 |
| $A_{12}$= | 1.757259E+02 | −2.036011E+01 | 3.815824E−02 | −1.305021E−04 |
| $A_{14}$= | −2.959459E+02 | 1.703516E+01 | −1.032930E−02 | 2.886943E−05 |
| $A_{16}$= | 2.891641E+02 | −8.966359E+00 | 1.413303E−03 | −6.459004E−06 |
| $A_{18}$= | −1.509364E+02 | 2.684766E+00 | −8.701682E−05 | 6.571792E−07 |
| $A_{20}$= | 3.243879E+01 | −3.481557E−01 | 1.566415E−06 | −2.325503E−08 |

Table 1 is the detailed structural data to the first embodiment in FIG. 1A, wherein the unit for the curvature radius, the central thickness, the distance, and the focal length is millimeters (mm). Surfaces 0-14 illustrate the surfaces from the object side to the image plane in the optical image capturing system. Table 2 shows the aspheric coefficients of the first embodiment, wherein k is the conic coefficient in the aspheric surface equation, and $A_1$-$A_{20}$ are respectively the first to the twentieth order aspheric surface coefficients. Besides, the tables in the following embodiments correspond to the schematic view and the aberration graphs, respectively, and definitions of parameters in these tables are similar to those in the Table 1 and the Table 2, so the repetitive details will not be given here.

Second Embodiment

Figure 2A:
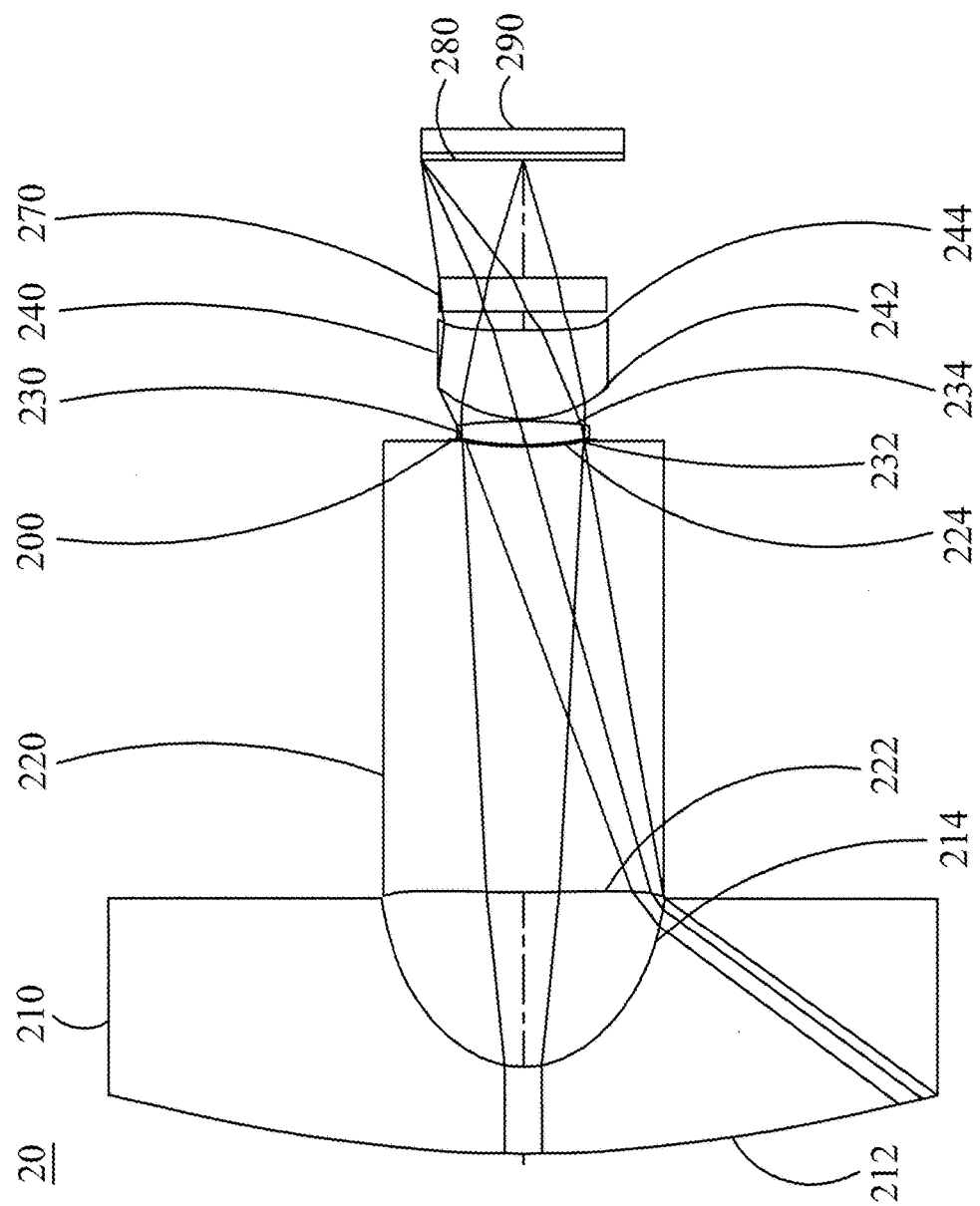
FIG. 2A is a schematic view of the optical image capturing system according to the second embodiment of the present invention.
Figure 2B:
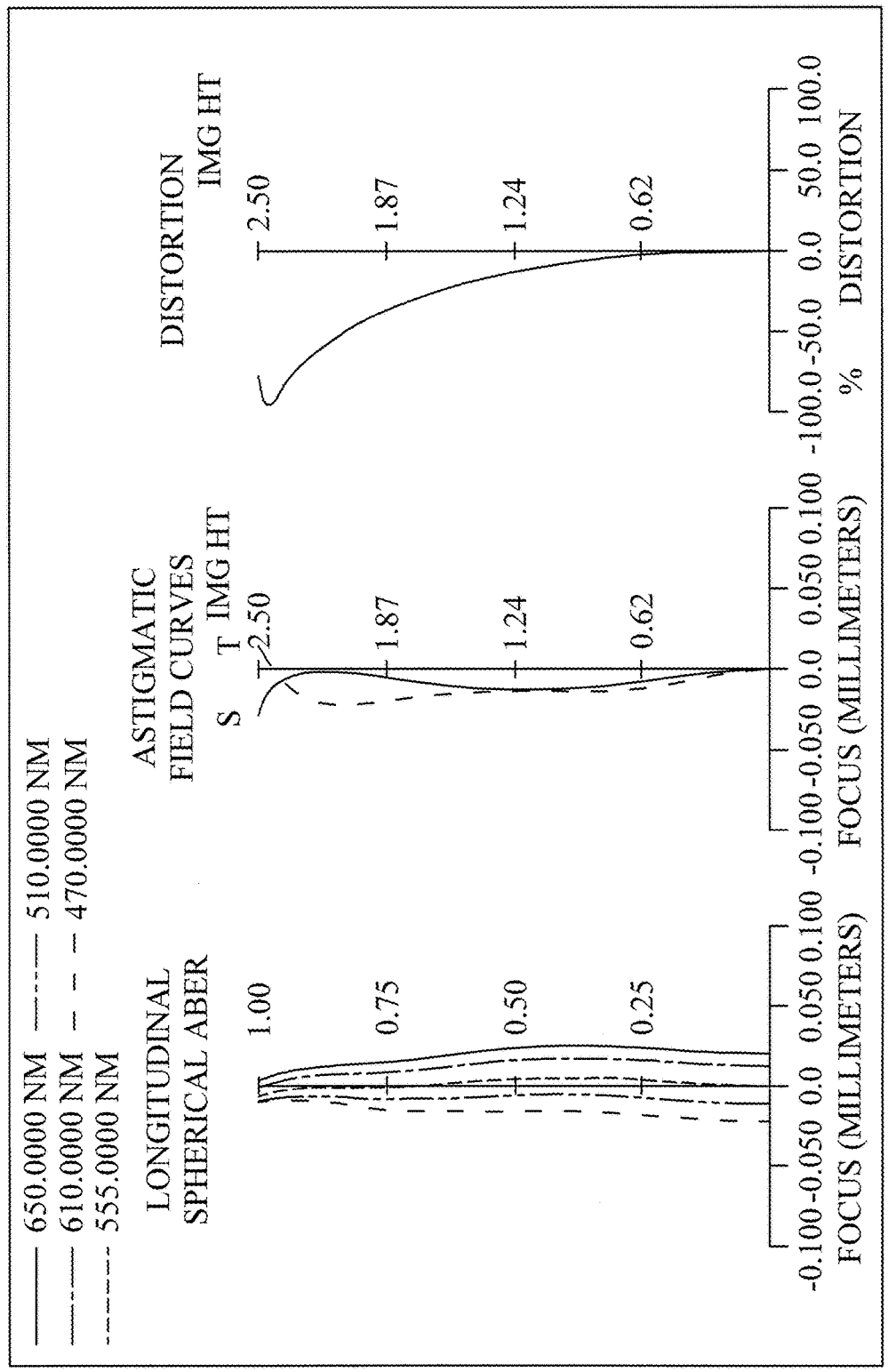
FIG. 2B shows the longitudinal spherical aberration curves, astigmatic field curves, and an optical distortion grid of the optical image capturing system in the order from left to right according to the second embodiment of the present invention.
Figure 2C:
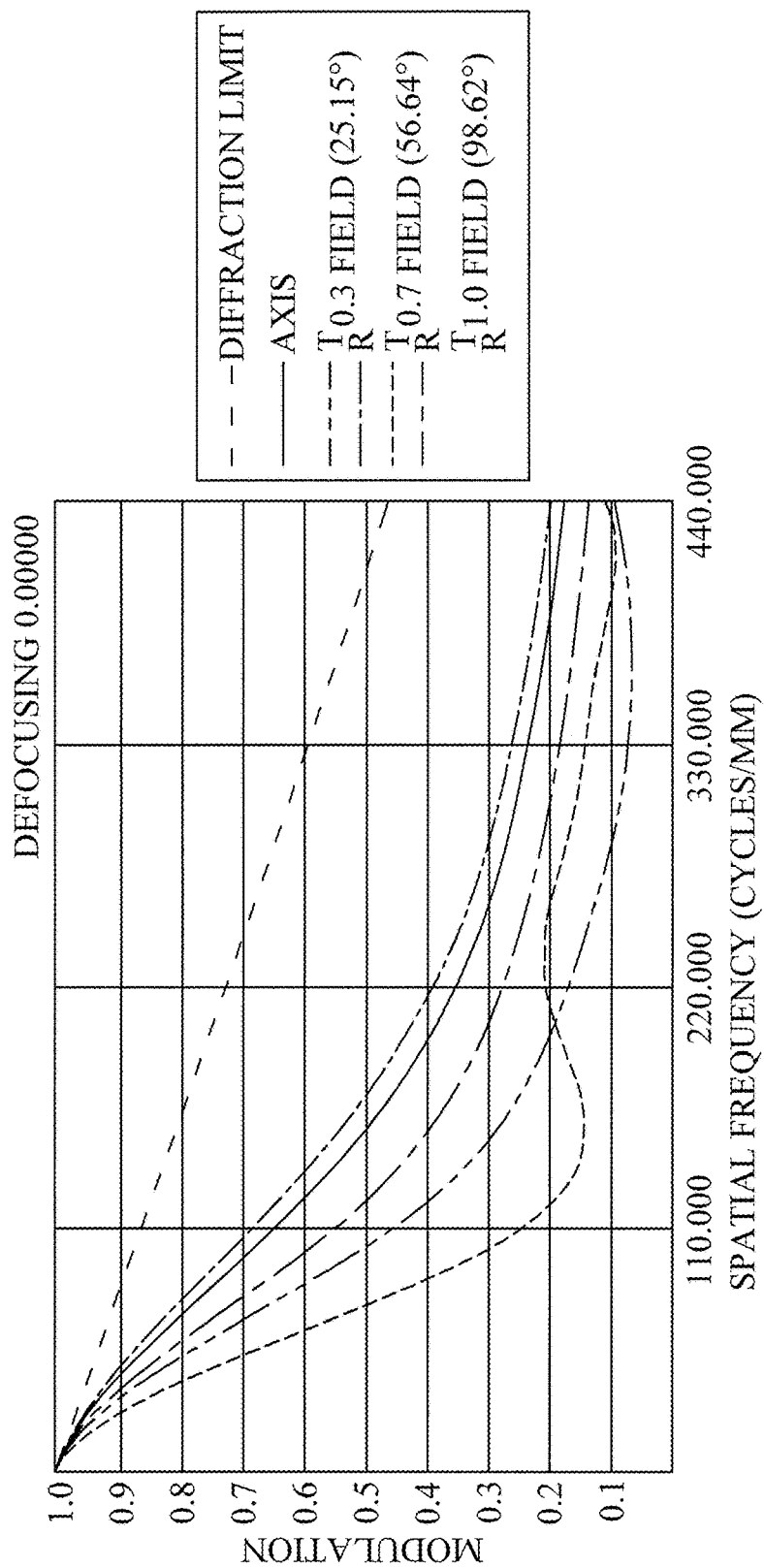
FIG. 2C is a characteristic diagram of modulation transfer of visible light spectrum for the optical image capturing system according to the second embodiment of the present invention.

Please refer to FIG. 2A, FIG. 2B and FIG. 2C. FIG. 2A is a schematic view of the optical image capturing system according to the second embodiment of the present invention. FIG. 2B shows the longitudinal spherical aberration curves, astigmatic field curves, and an optical distortion grid of the optical image capturing system of the second embodiment, in the order from left to right. FIG. 2C is a characteristic diagram of modulation transfer of visible light for the optical image capturing system of the second embodiment of the present invention. As shown in FIG. 2A, in the order from an object side to an image side, the optical image capturing system includes a first lens element 210, an aperture stop 200, a second lens element 220, a third lens element 230, a fourth lens element 240, an IR-bandstop filter 270, an image plane 280, and an image sensing device 290.

The first lens element 210 has negative refractive power and is made of plastic material. The first lens element 210 has a convex object-side surface 212 and a concave image-side surface 214, and both object-side surface 212 and image-side surface 214 are aspheric.

The second lens element 220 has negative refractive power and is made of plastic material. The second lens element 220 has a convex object-side surface 222 and a concave image-side surface 224, and both object-side surface 222 and image-side surface 224 are aspheric.

The third lens element 230 has positive refractive power and is made of plastic material. The third lens element 230 has a convex object-side surface 232 and a convex image-side surface 234, and both object-side surface 232 and image-side surface 234 are aspheric.

The fourth lens element 240 has positive refractive power and is made of plastic material. The fourth lens element 240 has a convex object-side surface 242 and a convex image-side surface 244, and both object-side surface 242 and image-side surface 244 are aspheric. The image-side surface 244 thereof has an inflection point.

The IR-bandstop filter 270 is made of glass material and is disposed between the fourth lens element 240 and the image plane 280, without affecting the focal length of the optical image capturing system.

Table 3 and Table 4 below should be incorporated into the reference of the present embodiment

TABLE 3

Lens Parameters for the Second Embodiment
f(focal length) = 1.6575 mm; f/HEP = 1.8; HAF(half angle of view) = 100 deg

| Surface No. | | Curvature Radius | Thickness (mm) | Material | Refractive Index | Abbe Number | Focal Length |
|---|---|---|---|---|---|---|---|
| 0 | Object | 1E+18 | 1E+13 | | | | |
| 1 | Lens 1 | 30.66581757 | 2.197 | Plastic | 1.565 | 58.00 | −4.584091 |
| 2 | | 2.333148272 | 4.431 | | | | |
| 3 | Aperture Stop | 33.55184092 | 11.276 | | 1.661 | 20.40 | −26.348737 |
| 4 | Lens 2 | 9.980785893 | 0.191 | Plastic | | | |
| 5 | | 1E+18 | −0.141 | | | | |
| 6 | Lens 3 | 10.78135723 | 0.593 | Plastic | 1.565 | 58.00 | 9.43566 |
| 7 | | −10.40051786 | 0.050 | | | | |
| 8 | Lens 4 | 2.911780514 | 2.260 | Plastic | 1.565 | 58.00 | 5.028685 |
| 9 | | −96.16529773 | 0.450 | | | | |
| 10 | IR-bandstop filter | 1E+18 | 0.850 | BK7_SCHOTT | 1.517 | 64.13 | |
| 11 | | 1E+18 | 2.989 | | | | |
| 12 | Image plane | 1E+18 | −0.005 | | | | |

Reference wavelength = 555 nm

TABLE 4

The Aspheric Coefficients of the Second Embodiment
Table 4: Aspheric Coefficients

| Surface No. | 1 | 2 | 4 | 5 | 6 | 7 |
|---|---|---|---|---|---|---|
| k = | −4.064474E+00 | −5.780924E−01 | 4.484625E+01 | 2.528635E+01 | 1.352424E+01 | 2.666829E+01 |
| $A_4$ = | −4.872111E−06 | −1.082035E−03 | −1.458112E−03 | −2.512820E−03 | 6.182264E−03 | 5.060687E−03 |
| $A_6$ = | −1.104328E−07 | 8.710659E−05 | −1.998888E−05 | 1.616743E−03 | 1.637561E−03 | −4.835531E−04 |
| $A_8$ = | 6.377808E−10 | −7.947882E−06 | 1.461706E−06 | −1.526840E−04 | −2.209856E−04 | 3.006480E−04 |
| $A_{10}$ = | −8.219756E−14 | 3.544389E−07 | −3.457811E−07 | −8.934436E−05 | −6.877054E−05 | −4.849863E−05 |
| $A_{12}$ = | 0.000000E+00 | 0.000000E+00 | 0.000000E+00 | 0.000000E+00 | 0.000000E+00 | 0.000000E+00 |

| Surface No. | 8 | 9 |
|---|---|---|
| k = | −1.011877E+00 | −4.517524E+01 |
| $A_4$ = | 4.643164E−04 | 8.548854E−03 |
| $A_6$ = | 6.206752E−04 | 1.045792E−03 |
| $A_8$ = | −2.460157E−05 | 3.767432E−05 |
| $A_{10}$ = | 8.761472E−07 | 1.319189E−05 |
| $A_{12}$ = | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 3 and Table 4.

| Second Embodiment (Primary reference wavelength = 555 nm) | | | | | |
|---|---|---|---|---|---|
| ETP1 | ETP2 | ETP3 | ETP4 | ED12/ED23 | SED |
| 2.239 | 11.284 | 0.573 | 2.223 | 88.631 | 4.535 |
| ETP1/TP1 | ETP2/TP2 | ETP3/TP3 | ETP4/TP4 | ED23/ED34 | SETP |
| 1.019 | 1.001 | 0.966 | 0.984 | 0.513 | 16.319 |
| ETL | EBL | EIN | EIR | PIR | STP |
| 25.139 | 4.285 | 20.854 | 0.451 | 0.450 | 16.327 |
| EIN/ETL | SETP/EIN | EIR/PIR | EBL/BL | BL | SETP/STP |
| 0.830 | 0.783 | 1.002 | 0.6209 | 6.9011 | 1.000 |
| ED12 | ED23 | ED34 | ED12/IN12 | ED23/IN23 | ED34/IN34 |
| 4.389 | 0.050 | 0.097 | 0.990 | 0.990 | 1.931 |
| InRS41 | InRS42 | HVT41 | HVT42 | ODT % | TDT % |
| 0.40661 | 0.01051 | 0.00000 | 0.53704 | −111.12300 | 111.12300 |
| \|f/f1\| | \|f/f2\| | \|f/f3\| | \|f/f4\| | \|f1/f2\| | \|f2/f3\| |
| 0.36157 | 0.06290 | 0.17566 | 0.32965 | 0.17398 | 2.79246 |
| ΣPPR | ΣNPR | ΣPPR/\|ΣNPR\| | ΣPP | ΣNP | f1/ΣPP |
| 0.23856 | 0.69122 | 0.34513 | −16.91304 | 0.44382 | 1.55789 |
| f4/ΣNP | IN12/f | IN23/f | IN34/f | TP3/f | TP4/f |
| −10.32871 | 2.67352 | 0.03017 | 0.03017 | 0.35795 | 1.36356 |
| InTL | HOS | HOS/HOI | InS/HOS | InTL/HOS | ΣTP/InTL |
| 20.85790 | 25.14140 | 10.05656 | 0.28025 | 0.82962 | 0.78276 |
| (TP1 + IN12)/ TP2 | (TP4 + IN34)/ TP3 | TP1/TP2 | TP3/TP4 | IN23/(TP2 + IN23 + TP3) | |
| 0.58785 | 3.89368 | 0.19487 | 0.26251 | 0.00420 | |
| \|InRS41\|/TP4 | \|InRS42\|/TP4 | HVT42/HOI | HVT42/HOS | | |
| 0.1799 | 0.0047 | 0.2148 | 0.0214 | | |
| MTFE0 | MTFE3 | MTFE7 | MTFQ0 | MTFQ3 | MTFQ7 |
| 0.85 | 0.78 | 0.66 | 0.64 | 0.45 | 0.24 |

The following values for the conditional expressions can be obtained from the data in Table 3 and Table 4.

| Values Related to Inflection Point of Second Embodiment (Primary Reference Wavelength = 555 nm) | | | | | |
|---|---|---|---|---|---|
| HIF421 | 0.3136 | HIF421/HOI | 0.1036 | SGI421 | −0.0004 | \|SGI421\|/(\|SGI421\| + TP4) | 0.0002 |

Third Embodiment

Figure 3A:
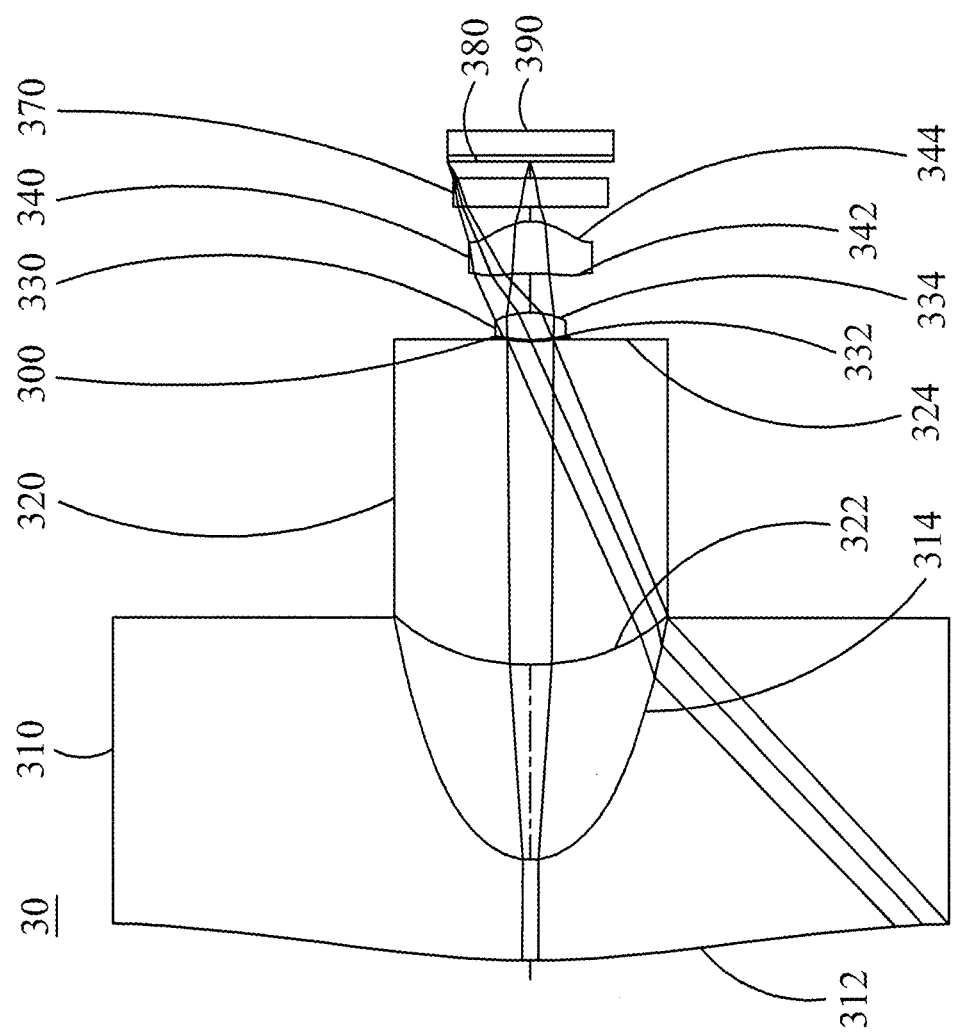
FIG. 3A is a schematic view of the optical image capturing system according to the third embodiment of the present invention.
Figure 3B:
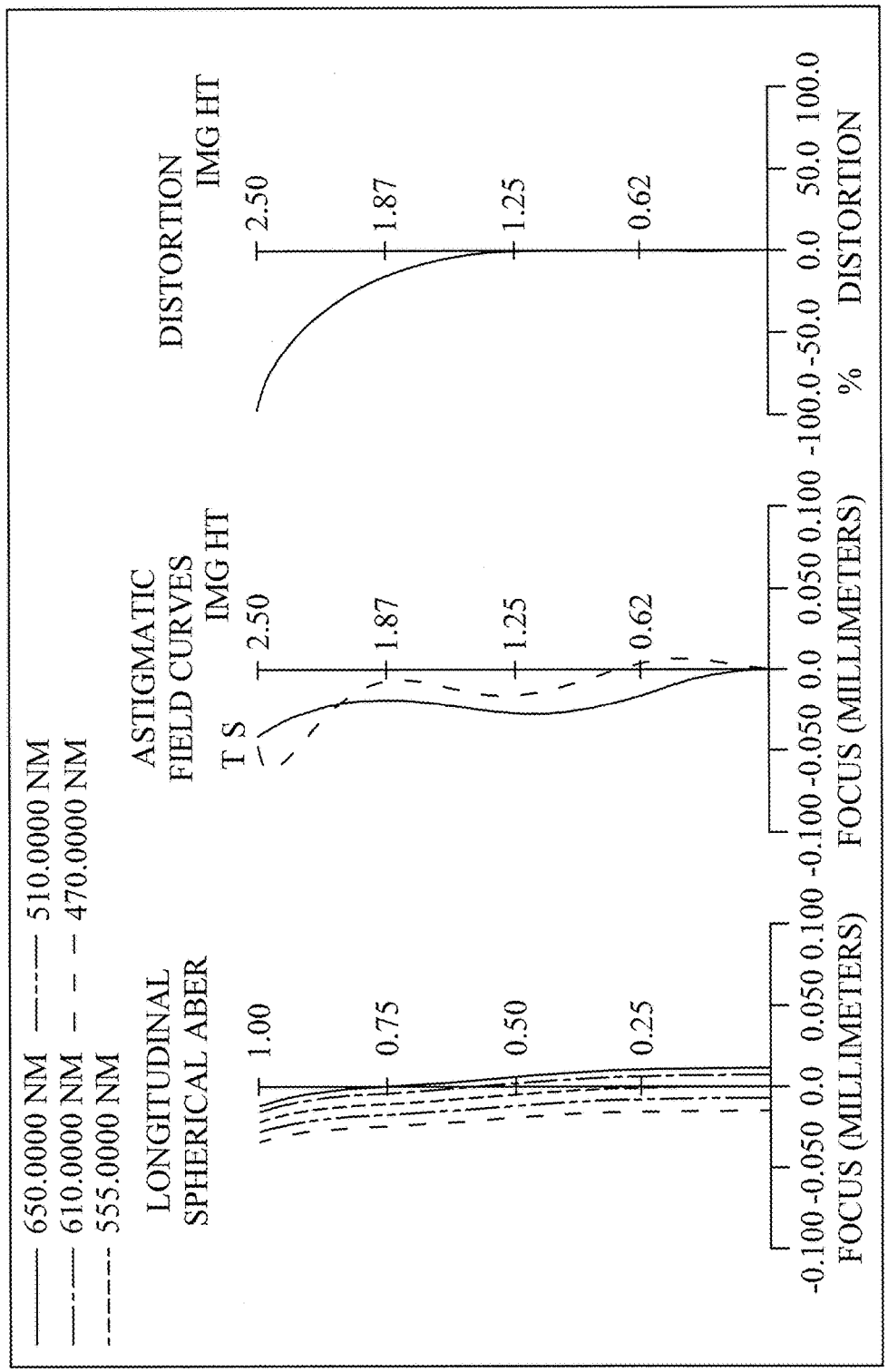
FIG. 3B shows the longitudinal spherical aberration curves, astigmatic field curves, and an optical distortion grid of the optical image capturing system in the order from left to right according to the third embodiment of the present invention.
Figure 3C:
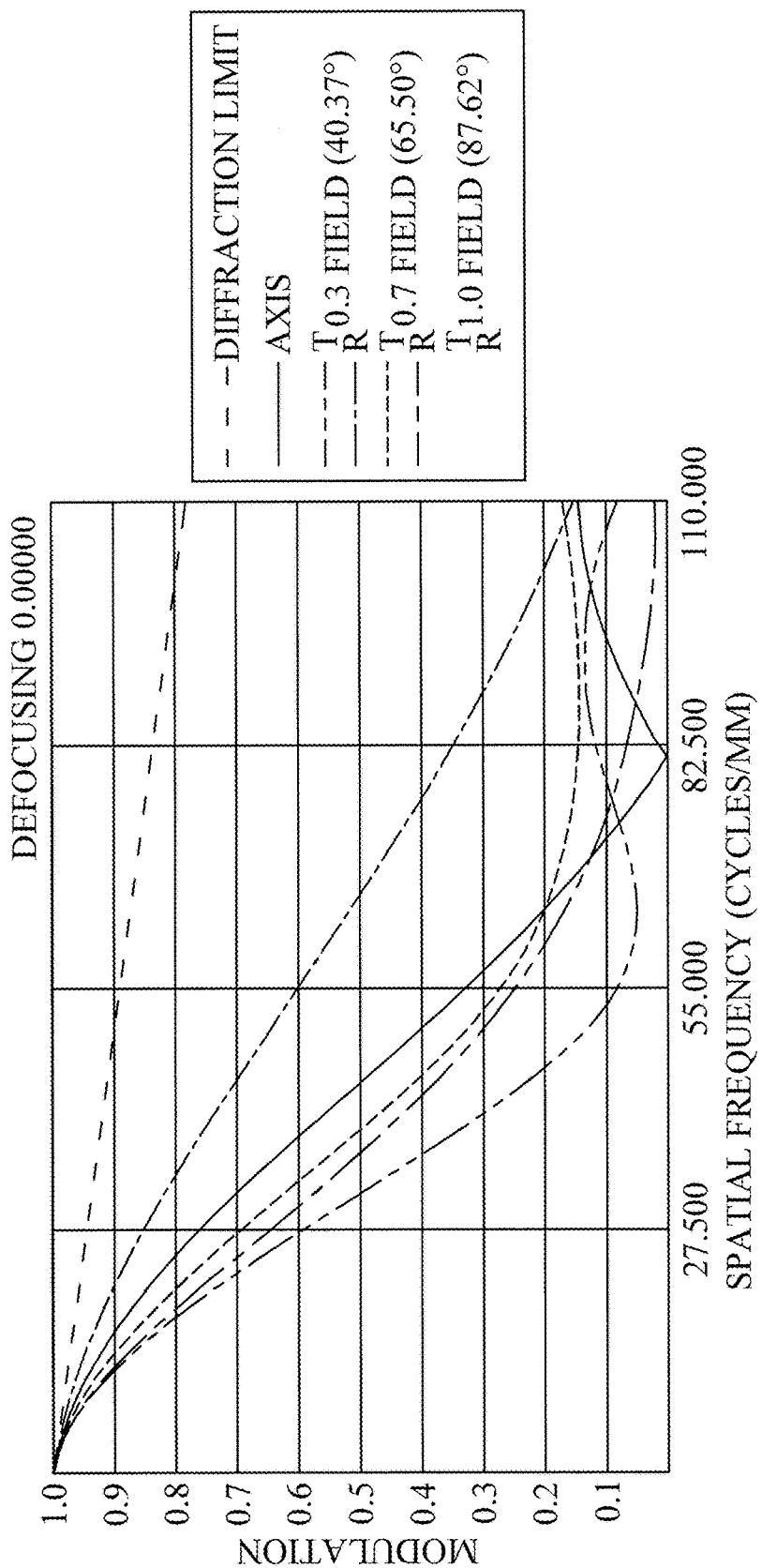
FIG. 3C is a characteristic diagram of modulation transfer of visible light spectrum for the optical image capturing system according to the third embodiment of the present invention.

Please refer to FIG. 3A to FIG. 3C. FIG. 3A is a schematic view of the optical image capturing system according to the third embodiment of the present invention. FIG. 3B shows the longitudinal spherical aberration curves, astigmatic field curves, and an optical distortion grid of the optical image capturing system, in the order from left to right, according to the third embodiment of the present invention. FIG. 3C is a characteristic diagram of modulation transfer of visible light spectrum for the optical image capturing system according to the third embodiment of the present invention. As shown in FIG. 3A, in the order from an object side to an image side, the optical image capturing system includes a first lens element 310, an aperture stop 300, a second lens element 320, a third lens element 330, a fourth lens element 340, an IR-bandstop filter 370, an image plane 380, and an image sensing device 390.

The first lens element 310 has negative refractive power and is made of plastic material. The first lens element 310 has a convex object-side surface 312 and a concave image-side surface 314, and both object-side surface 312 and image-side surface 314 are aspheric. The object-side surface 312 has an inflection point.

The second lens element 320 has positive refractive power and is made of plastic material. The second lens element 320 has a convex object-side surface 322 and a concave image-side surface 324, and both object-side surface 322 and image-side surface 324 are aspheric.

The third lens element 330 has positive refractive power and is made of plastic material. The third lens element 330 has a convex object-side surface 332 and a convex image-side surface 334, and both object-side surface 332 and image-side surface 334 are aspheric.

The fourth lens element 340 has positive refractive power and is made of plastic material. The fourth lens element 340 has a concave object-side surface 342 and a convex image-side surface 344; both object-side surface 342 and image-side surface 344 are aspheric and have an inflection point.

The IR-bandstop filter 370 is made of glass material and is disposed between the fourth lens element 340 and the image plane 380, without affecting the focal length of the optical image capturing system.

Table 5 and Table 6 below should be incorporated into the reference of the present embodiment.

TABLE 5

Lens Parameters for the Third Embodiment
f(focal length) = 0.8769 mm; f/HEP = 1.8; HAF(half angle of view) = 89.9374 deg

| Surface No. | | Curvature Radius | Thickness (mm) | Material | Refractive Index | Abbe Number | Focal Length |
|---|---|---|---|---|---|---|---|
| 0 | Object | 1E+18 | 1E+13 | | | | |
| 1 | Lens 1 | 28.07910799 | 3.098 | Plastic | 1.565 | 58.00 | −3.667043 |
| 2 | | 1.857944684 | 5.966 | | | | |
| 3 | Aperture stop | 7.806440596 | 9.863 | | 1.661 | 20.40 | 51.295929 |
| 4 | Lens 2 | 5.002381741 | 0.055 | Plastic | | | |
| 5 | | 1E+18 | −0.005 | | | | |
| 6 | Lens 3 | 4.127666152 | 0.823 | Plastic | 1.565 | 58.00 | 2.973894 |
| 7 | | −2.643454474 | 1.187 | | | | |
| 8 | Lens 4 | −10.1156364 | 1.580 | Plastic | 1.565 | 58.00 | 2.873086 |
| 9 | | −1.481884808 | 0.450 | | | | |
| 10 | IR-bandstop filter | 1E+18 | 0.850 | BK7_SCHOTT | 1.517 | 64.13 | |
| 11 | | 1E+18 | 0.534 | | | | |
| 12 | Image plane | 1E+18 | −0.014 | | | | |

Reference wavelength = 555 nm

TABLE 6

The Aspheric Coefficients of the Third Embodiment
Table 6: Aspheric Coefficients

| Surface No. | 1 | 2 | 4 | 5 | 6 | 7 |
|---|---|---|---|---|---|---|
| k = | −2.592627E+01 | −8.240297E−01 | 1.536112E+00 | 2.573554E+01 | −5.571346E+00 | −3.068470E+00 |
| $A_4$ = | −3.730245E−06 | 5.303109E−03 | 1.502348E−03 | 1.804070E−03 | 6.025421E−03 | −2.644356E−02 |
| $A_6$ = | −2.878063E−07 | −8.798417E−05 | −9.985099E−05 | −3.955315E−02 | −1.343825E−02 | 4.915455E−03 |
| $A_8$ = | 1.579614E−09 | 9.720279E−06 | 3.373301E−06 | 4.834148E−02 | −6.536554E−03 | −1.240711E−02 |
| $A_{10}$ = | −2.485202E−12 | −8.190281E−07 | −7.729027E−08 | −5.601860E−02 | 5.616476E−03 | −2.086211E−03 |
| $A_{12}$ = | 0.000000E+00 | 0.000000E+00 | 0.000000E+00 | 0.000000E+00 | 0.000000E+00 | 0.000000E+00 |

| Surface No. | 8 | 9 |
|---|---|---|
| k = | −5.000000E+01 | −2.057448E+00 |
| $A_4$ = | −1.234871E−02 | 3.051780E−05 |
| $A_6$ = | 1.964727E−02 | 1.888134E−03 |
| $A_8$ = | −4.657142E−03 | 2.346083E−03 |
| $A_{10}$ = | 3.812161E−04 | −3.270525E−04 |
| $A_{12}$ = | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

Third Embodiment (Primary Reference Wavelength = 555 nm)

| ETP1 | ETP2 | ETP3 | ETP4 | ED12/ED23 | SED |
|---|---|---|---|---|---|
| 3.113 | 9.865 | 0.804 | 1.563 | 116.390 | 7.2 |

| ETP1/TP1 | ETP2/TP2 | ETP3/TP3 | ETP4/TP4 | ED23/ED34 | SETP |
|---|---|---|---|---|---|
| 1.005 | 1.000 | 0.978 | 0.989 | 0.043 | 15.346 |

| ETL | EBL | EIN | EIR | PIR | STP |
|---|---|---|---|---|---|
| 24.386 | 1.840 | 22.546 | 0.470 | 0.450 | 15.364 |

Third Embodiment (Primary Reference Wavelength = 555 nm)

| EIN/ETL | SETP/EIN | EIR/PIR | EBL/BL | BL | SETP/STP |
|---|---|---|---|---|---|
| 0.925 | 0.681 | 1.044 | 0.3548 | 5.1864 | 0.999 |

| ED12 | ED23 | ED34 | ED12/IN12 | ED23/IN23 | ED34/IN34 |
|---|---|---|---|---|---|
| 5.953 | 0.051 | 1.195 | 0.998 | 1.023 | 1.007 |

| InRS41 | InRS42 | HVT41 | HVT42 | ODT % | TDT % |
|---|---|---|---|---|---|
| −0.04405 | −0.60655 | 1.19126 | 0.00000 | −100.31100 | 96.96380 |

| |f/f1| | |f/f2| | |f/f3| | |f/f4| | |f1/f2| | |f2/f3| |
|---|---|---|---|---|---|
| 0.23913 | 0.01710 | 0.29487 | 0.30522 | 0.07149 | 17.24875 |

| ΣPPR | ΣNPR | ΣPPR/|ΣNPR| | ΣPP | ΣNP | f1/ΣPP |
|---|---|---|---|---|---|
| 0.31197 | 0.54435 | 0.57310 | 54.26979 | −0.79395 | 0.94520 |

-continued

| Third Embodiment (Primary Reference Wavelength = 555 nm) | | | | | |
|---|---|---|---|---|---|
| f4/ΣNP | IN12/f | IN23/f | IN34/f | TP3/f | TP4/f |
| 4.61873 | 6.80301 | 0.05702 | 1.35374 | 0.93834 | 1.80218 |
| InTL | HOS | HOS/HOI | InS/HOS | InTL/HOS | ΣTP/InTL |
| 22.56690 | 24.38690 | 9.75476 | 0.22164 | 0.92537 | 0.68083 |
| (TP1 + IN12)/ TP2 | (TP4 + IN34)/ TP3 | TP1/TP2 | TP3/TP4 | IN23/(TP2 + IN23 + TP3) | |
| 0.91891 | 3.36329 | 0.31408 | 0.52067 | 0.00466 | |
| \|InRS41\|/TP4 | \|InRS42\|/TP4 | HVT42/HOI | HVT42/HOS | | |
| 0.0279 | 0.3838 | 0.0000 | 0.0000 | | |
| MTFE0 | MTFE3 | MTFE7 | MTFQ0 | MTFQ3 | MTFQ7 |
| 0.33 | 0.08 | 0.27 | 0.15 | 0.08 | 0.17 |

The following values for the conditional expressions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF111 | 6.3157 | HIF111/HOI | 2.0857 | SGI111 | 0.5469 | \|SGI111\|/(\|SGI111\| + TP1) | 0.4769 |
| HIF411 | 0.7676 | HIF411/HOI | 0.2535 | SGI411 | −0.0281 | \|SGI411\|/(\|SGI411\| + TP4) | 0.0198 |
| HIF421 | 1.1554 | HIF421/HOI | 0.3816 | SGI421 | −0.3842 | \|SGI421\|/(\|SGI421\| + TP4) | 0.2162 |

Fourth Embodiment

Figure 4A:
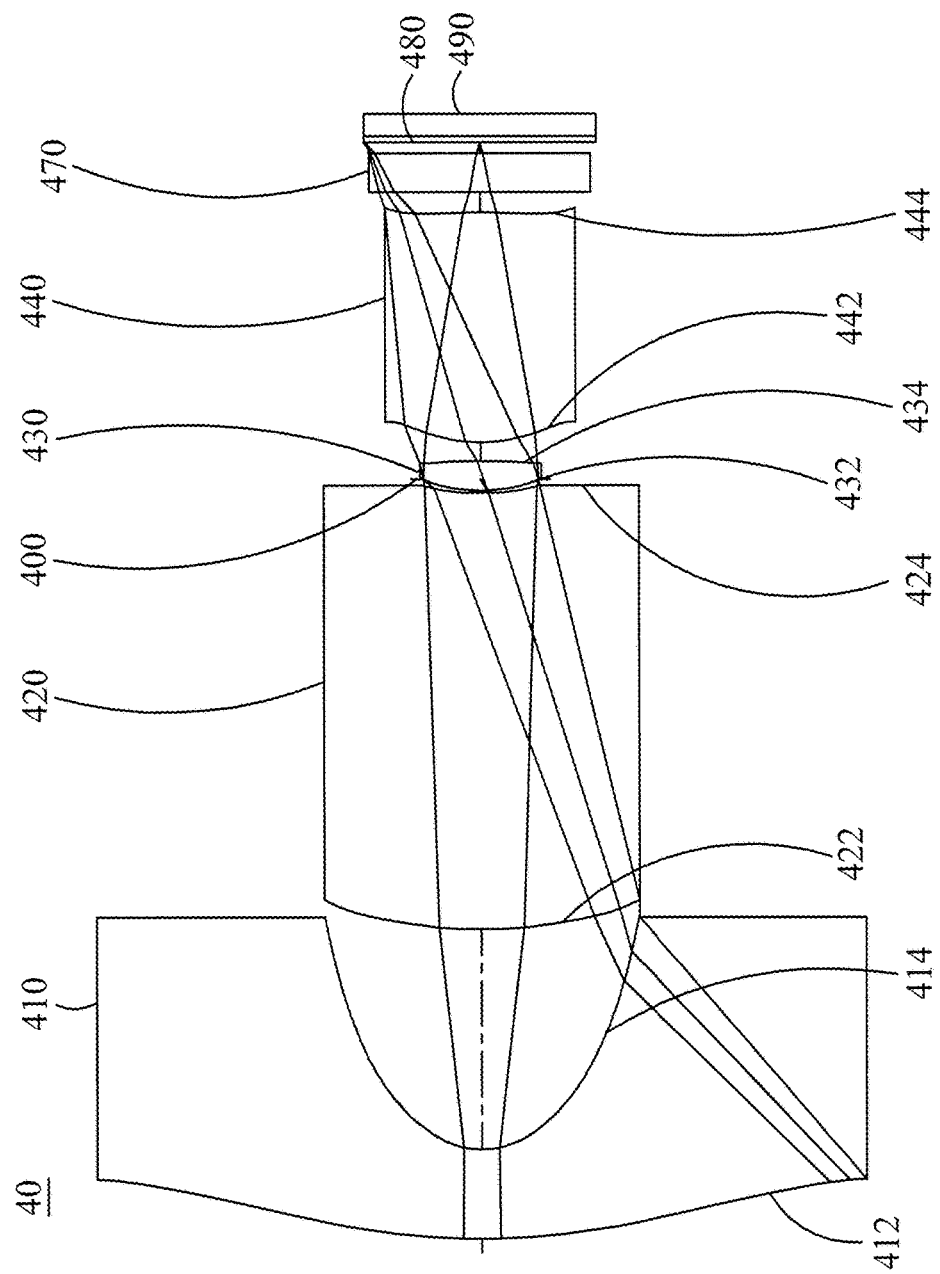
FIG. 4A is a schematic view of the optical image capturing system according to the fourth embodiment of the present invention.
Figure 4B:
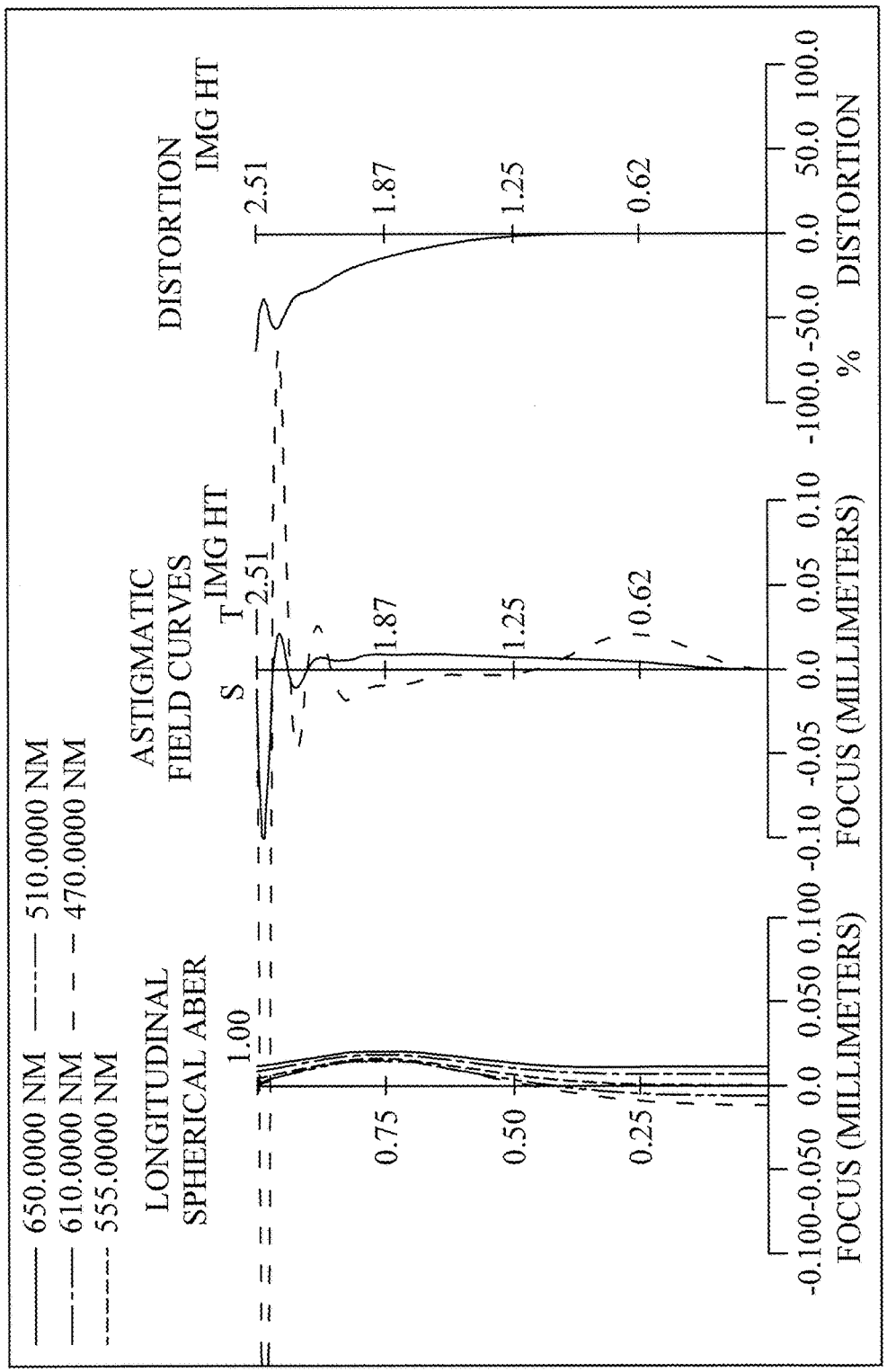
FIG. 4B shows the longitudinal spherical aberration curves, astigmatic field curves, and an optical distortion grid of the optical image capturing system in the order from left to right according to the fourth embodiment of the present invention.
Figure 4C:
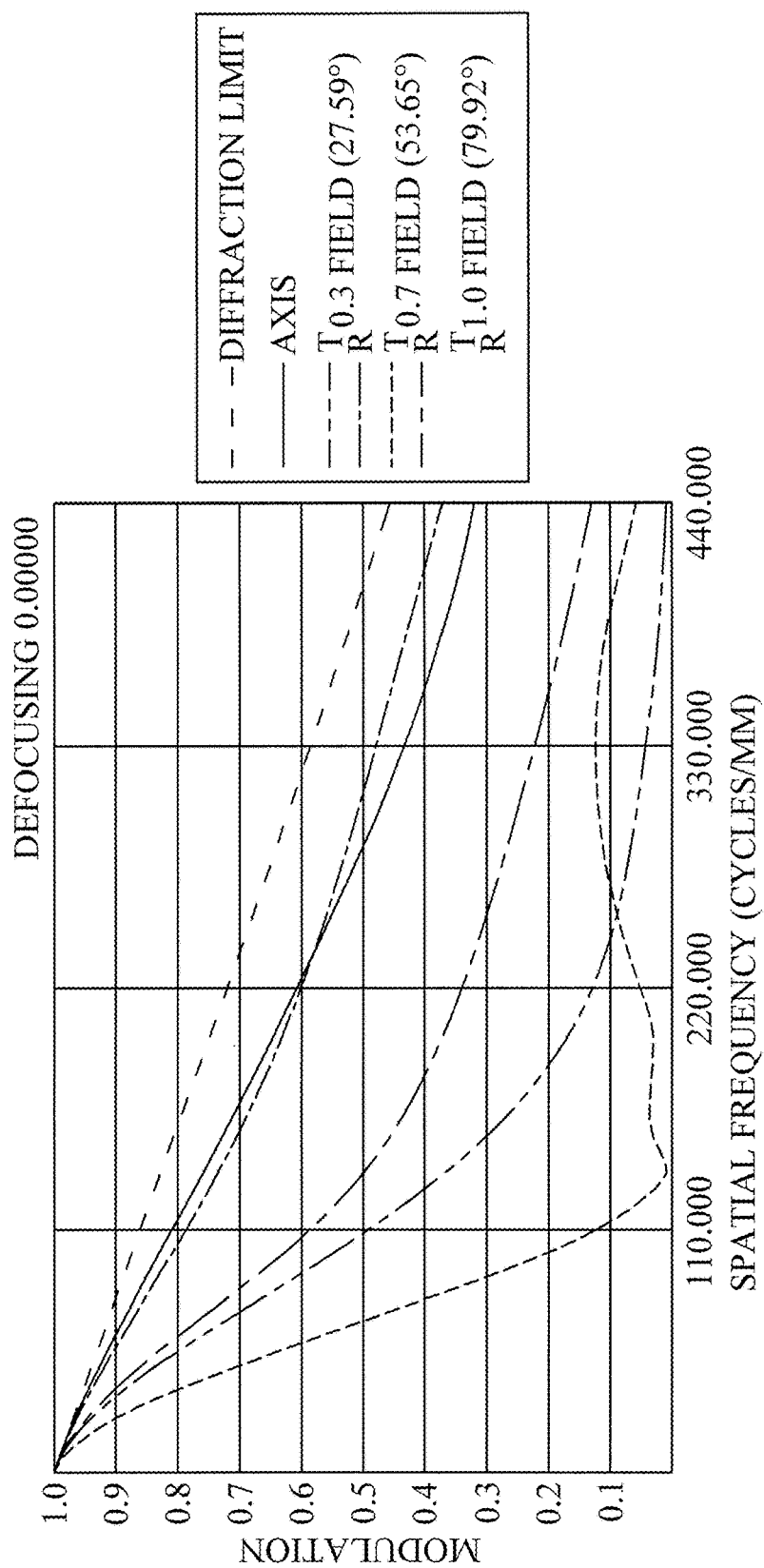
FIG. 4C is a characteristic diagram of modulation transfer of visible light spectrum for the optical image capturing system according to the fourth embodiment of the present invention.

Please refer to FIG. 4A to FIG. 4C. FIG. 4A is a schematic view of the optical image capturing system according to the fourth embodiment of the present invention. FIG. 4B shows the longitudinal spherical aberration curves, astigmatic field curves, and an optical distortion grid of the optical image capturing system, in the order from left to right, according to the fourth embodiment of the present invention. FIG. 4C is a characteristic diagram of modulation transfer of visible light spectrum for the optical image capturing system according to the fourth embodiment of the present invention.

As shown in FIG. 4A, in the order from an object side to an image side, the optical image capturing system includes a first lens element 410, an aperture stop 400, a second lens element 420, a third lens element 430, a fourth lens element 440, an IR-bandstop filter 470, an image plane 480, and an image sensing device 490.

The first lens element 410 has negative refractive power and is made of plastic material. The first lens element 410 has a convex object-side surface 412 and a concave image-side surface 414, and both object-side surface 412 and image-side surface 414 are aspheric. The object-side surface 412 has an inflection point.

The second lens element 420 has negative refractive power and is made of plastic material. The second lens element 420 has a convex object-side surface 422 and a convex image-side surface 424, and both object-side surface 422 and image-side surface 424 are aspheric. The image-side surface 424 thereof has an inflection point.

The third lens element 430 has positive refractive power and is made of plastic material. The third lens element 430 has a concave object-side surface 432 and a concave image-side surface 434, and both object-side surface 432 and image-side surface 434 are aspheric. The image-side surface 434 thereof has an inflection point.

The fourth lens element 440 has positive refractive power and is made of plastic material. The fourth lens element 440 has a convex object-side surface 442 and a convex image-side surface 444; both object-side surface 442 and image-side surface 444 are aspheric and have an inflection point.

The IR-bandstop filter 470 is made of glass material and is disposed between the fourth lens element 440 and the image plane 480, without affecting the focal length of the optical image capturing system.

Table 7 and Table 8 below should be incorporated into the reference of the present embodiment.

TABLE 7

Lens Parameters for the Fourth Embodiment
f(focal length) = 1.4317 mm; f/HEP = 1.8; HAF(half angle of view) = 80.0013 deg

| Surface No. | | Curvature Radius | Thickness (mm) | Material | Refractive Index | Abbe Number | Focal Length |
|---|---|---|---|---|---|---|---|
| 0 | Object | 1E+18 | 1E+13 | | | | |
| 1 | Lens 1 | 14.57252016 | 1.949 | Plastic | 1.565 | 58 | −3.68766 |
| 2 | | 1.739483979 | 4.837 | | | | |
| 3 | Aperture stop | 10.09653776 | 9.527 | | 1.661 | 20.4 | −394.139 |
| 4 | Lens 2 | 6.052937967 | 0.307 | Plastic | | | |
| 5 | | 1E+18 | −0.253 | | | | |
| 6 | Lens 3 | 3.943034134 | 0.639 | Plastic | 1.565 | 58 | 5.62304 |
| 7 | | −15.64795808 | 0.411 | | | | |
| 8 | Lens 4 | 2.963733696 | 5.018 | Plastic | 1.565 | 58 | 4.7348 |
| 9 | | −11.00024305 | 0.450 | | | | |
| 10 | IR-bandstop filter | 1E+18 | 0.850 | BK7_ SCHOTT | 1.517 | 64.13 | |
| 11 | | 1E+18 | 0.219 | | | | |
| 12 | Image Plane | 1E+18 | 0.013 | | | | |

Reference wavelength = 555 nm

TABLE 8

The Aspheric Coefficients of the Fourth Embodiment
Table 8: Aspheric Coefficients

| Surface No. | 1 | 2 | 4 | 5 | 6 | 7 |
|---|---|---|---|---|---|---|
| k = | 9.393133E−01 | −1.200229E+00 | 6.748665E+00 | −4.472759E+00 | −1.088408E+00 | −5.000000E+01 |
| $A_4$ = | −2.753366E−04 | 1.197005E−02 | −1.259249E−03 | 2.592755E−02 | 3.184585E−02 | −1.664571E−02 |
| $A_6$ = | −1.714414E−06 | 5.554338E−05 | 1.948022E−05 | −8.909309E−03 | −5.875903E−03 | 1.516447E−02 |
| $A_8$ = | 2.735189E−08 | −7.825267E−06 | −4.299808E−07 | 6.427630E−06 | −8.942120E−05 | −4.302541E−03 |
| $A_{10}$ = | −2.510701E−10 | 3.938268E−06 | −1.945739E−07 | 6.433843E−05 | 3.801939E−04 | 9.505698E−04 |
| $A_{12}$ = | 0.000000E+00 | 0.000000E+00 | 0.000000E+00 | 0.000000E+00 | 0.000000E+00 | 0.000000E+00 |

| Surface No. | 8 | 9 |
|---|---|---|
| k = | −6.810917E+00 | −4.999953E+01 |
| $A_4$ = | 9.856056E−03 | 1.675706E−02 |
| $A_6$ = | −1.213791E−03 | −3.293972E−03 |
| $A_8$ = | 1.295304E−04 | 1.132118E−03 |
| $A_{10}$ = | −1.288643E−04 | −1.200490E−04 |
| $A_{12}$ = | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

Fourth Embodiment (Primary Reference Wavelength = 555 nm)

| ETP1 | ETP2 | ETP3 | ETP4 | ED12/ED23 | SED |
|---|---|---|---|---|---|
| 1.989 | 9.532 | 0.613 | 4.985 | 79.324 | 5.302 |

| ETP1/TP1 | ETP2/TP2 | ETP3/TP3 | ETP4/TP4 | ED23/ED34 | SETP |
|---|---|---|---|---|---|
| 1.021 | 1.001 | 0.959 | 0.993 | 0.137 | 17.120 |

| ETL | EBL | EIN | EIR | PIR | STP |
|---|---|---|---|---|---|
| 23.961 | 1.539 | 22.422 | 0.457 | 0.450 | 17.133 |

| EIN/ETL | SETP/EIN | EIR/PIR | EBL/BL | BL | SETP/STP |
|---|---|---|---|---|---|
| 0.936 | 0.764 | 1.015 | 0.4057 | 3.7937 | 0.999 |

| ED12 | ED23 | ED34 | ED12/IN12 | ED23/IN23 | ED34/IN34 |
|---|---|---|---|---|---|
| 4.799 | 0.060 | 0.443 | 0.992 | 1.135 | 1.077 |

Fourth Embodiment (Primary Reference Wavelength = 555 nm) -continued

| InRS41 | InRS42 | HVT41 | HVT42 | ODT % | TDT % |
|---|---|---|---|---|---|
| 0.36979 | 0.09874 | 0.00000 | 1.16429 | −69.24830 | 64.56970 |

| |f/f1| | |f/f2| | |f/f3| | |f/f4| | |f1/f2| | |f2/f3| |
|---|---|---|---|---|---|
| 0.38825 | 0.00363 | 0.25462 | 0.30238 | 0.00936 | 70.09358 |

| ΣPPR | ΣNPR | ΣPPR/|ΣNPR| | ΣPP | ΣNP | f1/ΣPP |
|---|---|---|---|---|---|
| 0.25825 | 0.69063 | 0.37393 | −388.51596 | 1.04714 | 1.01447 |

| f4/ΣNP | IN12/f | IN23/f | IN34/f | TP3/f | TP4/f |
|---|---|---|---|---|---|
| −3.52165 | 3.37827 | 0.03723 | 0.28716 | 0.44627 | 3.50515 |

| InTL | HOS | HOS/HOI | InS/HOS | InTL/HOS | ΣTP/InTL |
|---|---|---|---|---|---|
| 22.43400 | 23.96610 | 9.58644 | 0.30657 | 0.93607 | 0.76370 |

| (TP1 + IN12)/TP2 | (TP4 + IN34)/TP3 | TP1/TP2 | TP3/TP4 | IN23/(TP2 + IN23 + TP3) |
|---|---|---|---|---|
| 0.71230 | 8.49781 | 0.20458 | 0.12732 | 0.00522 |

| |InRS41|/TP4 | |InRS42|/TP4 | HVT42/HOI | HVT42/HOS |
|---|---|---|---|
| 0.0737 | 0.0197 | 0.4657 | 0.0486 |

| MTFE0 | MTFE3 | MTFE7 | MTFQ0 | MTFQ3 | MTFQ7 |
|---|---|---|---|---|---|
| 0.92 | 0.8 | 0.65 | 0.81 | 0.49 | 0.13 |

The following values for the conditional expressions can be obtained from the data in Table 7 and Table 8.

Values Related to Inflection Point of Fourth Embodiment
(Primary Reference Wavelength = 555 nm)

| HIF111 | 5.0602 | HIF111/HOI | 1.6387 | SGI111 | 0.7367 | |SGI111|/(|SGI111| + TP1) | 0.2276 |
| HIF221 | 1.2534 | HIF221/HOI | 0.4059 | SGI221 | 0.1554 | |SGI221|/(|SGI221| + TP2) | 0.1663 |
| HIF321 | 0.9116 | HIF321/HOI | 0.2952 | SGI321 | −0.0300 | |SGI321|/(|SGI321| + TP3) | 0.0791 |
| HIF411 | 1.4660 | HIF411/HOI | 0.4748 | SGI411 | 0.3140 | |SGI411|/(|SGI411| + TP4) | 0.1116 |
| HIF421 | 0.6499 | HIF421/HOI | 0.2104 | SGI421 | −0.0157 | |SGI421|/(|SGI421| + TP4) | 0.0062 |

Fifth Embodiment

Figure 5A:
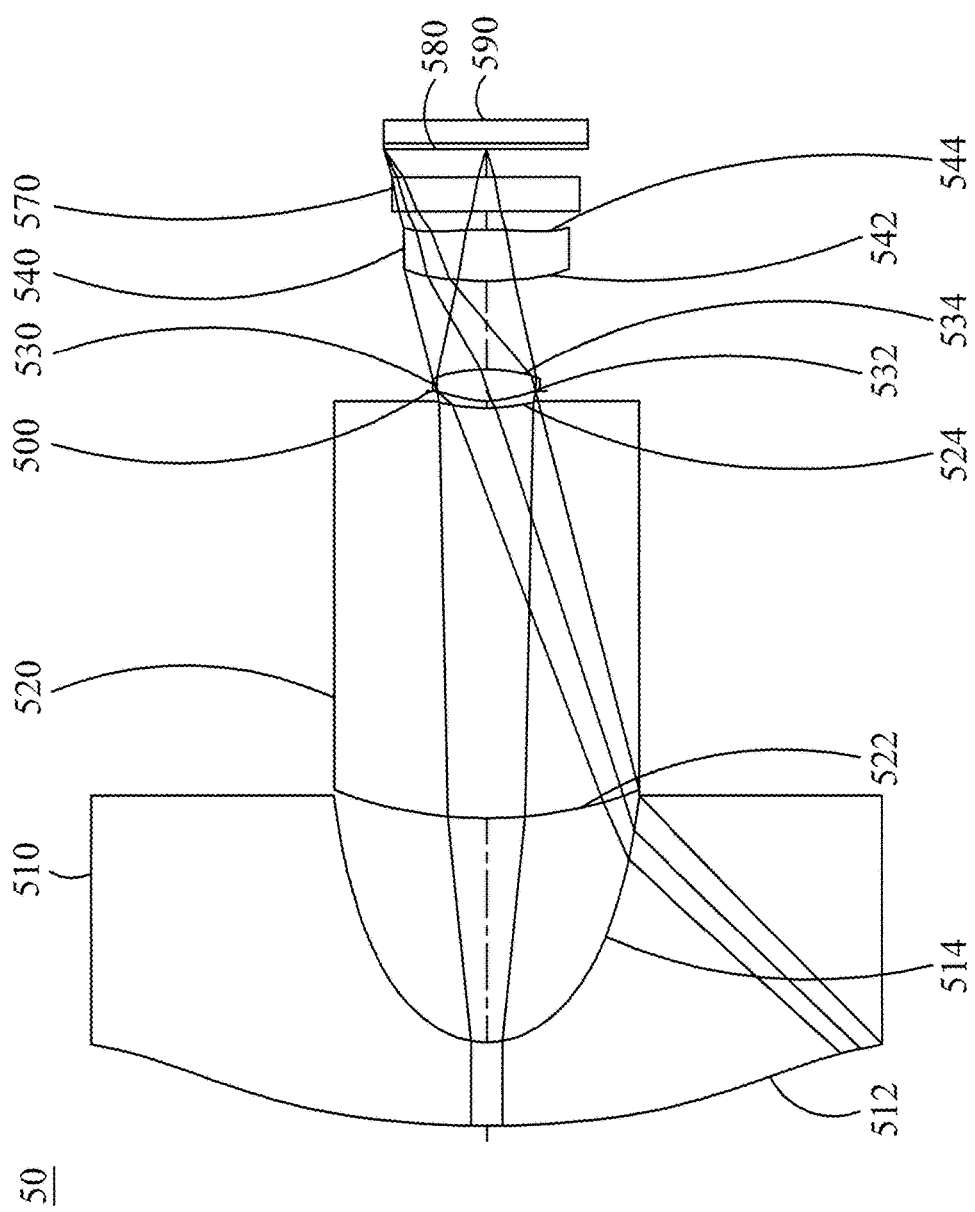
FIG. 5A is a schematic view of the optical image capturing system according to the fifth embodiment of the present invention.
Figure 5B:
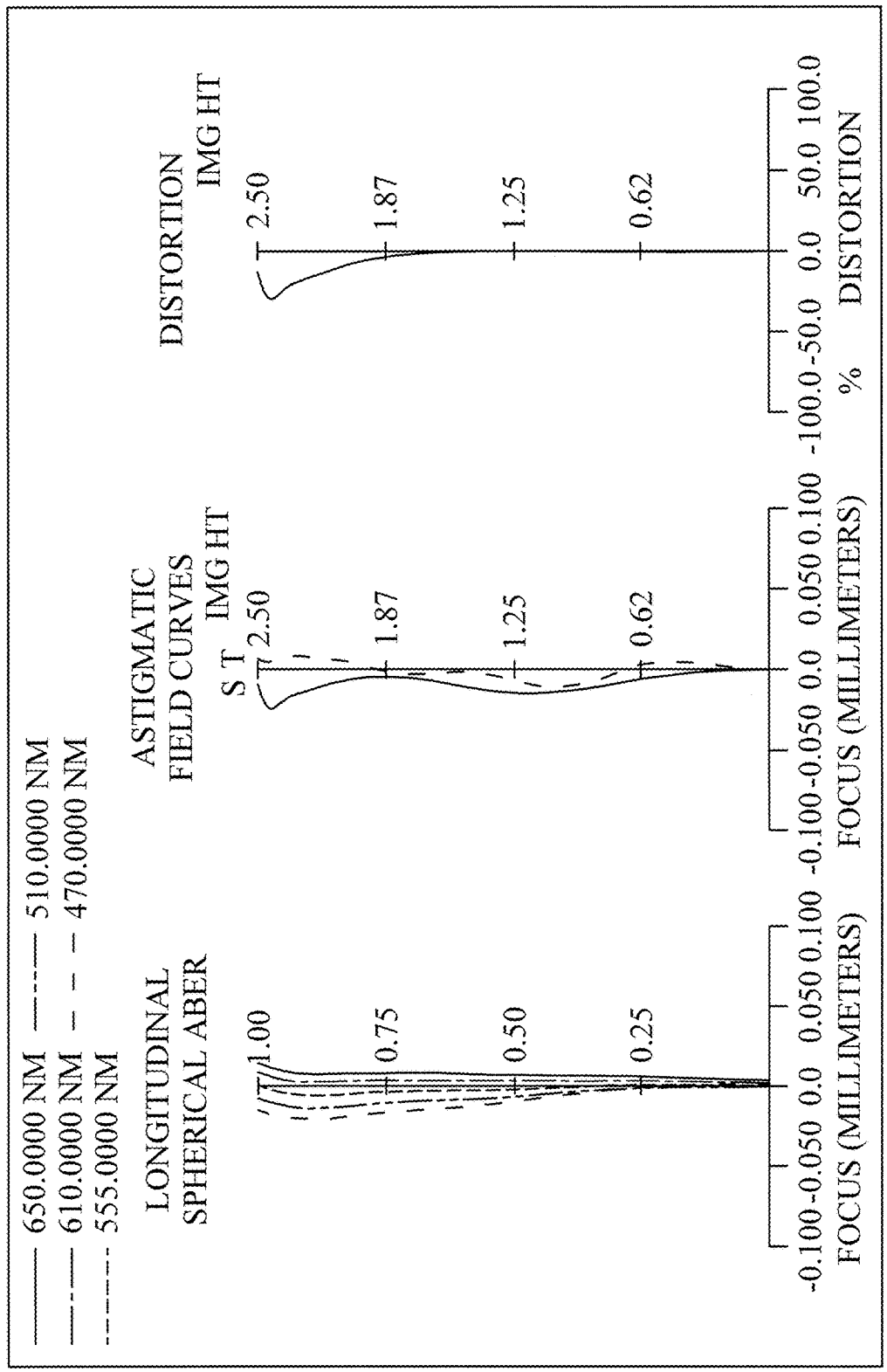
FIG. 5B shows the longitudinal spherical aberration curves, astigmatic field curves, and an optical distortion grid of the optical image capturing system in the order from left to right according to the fifth embodiment of the present invention.
Figure 5C:
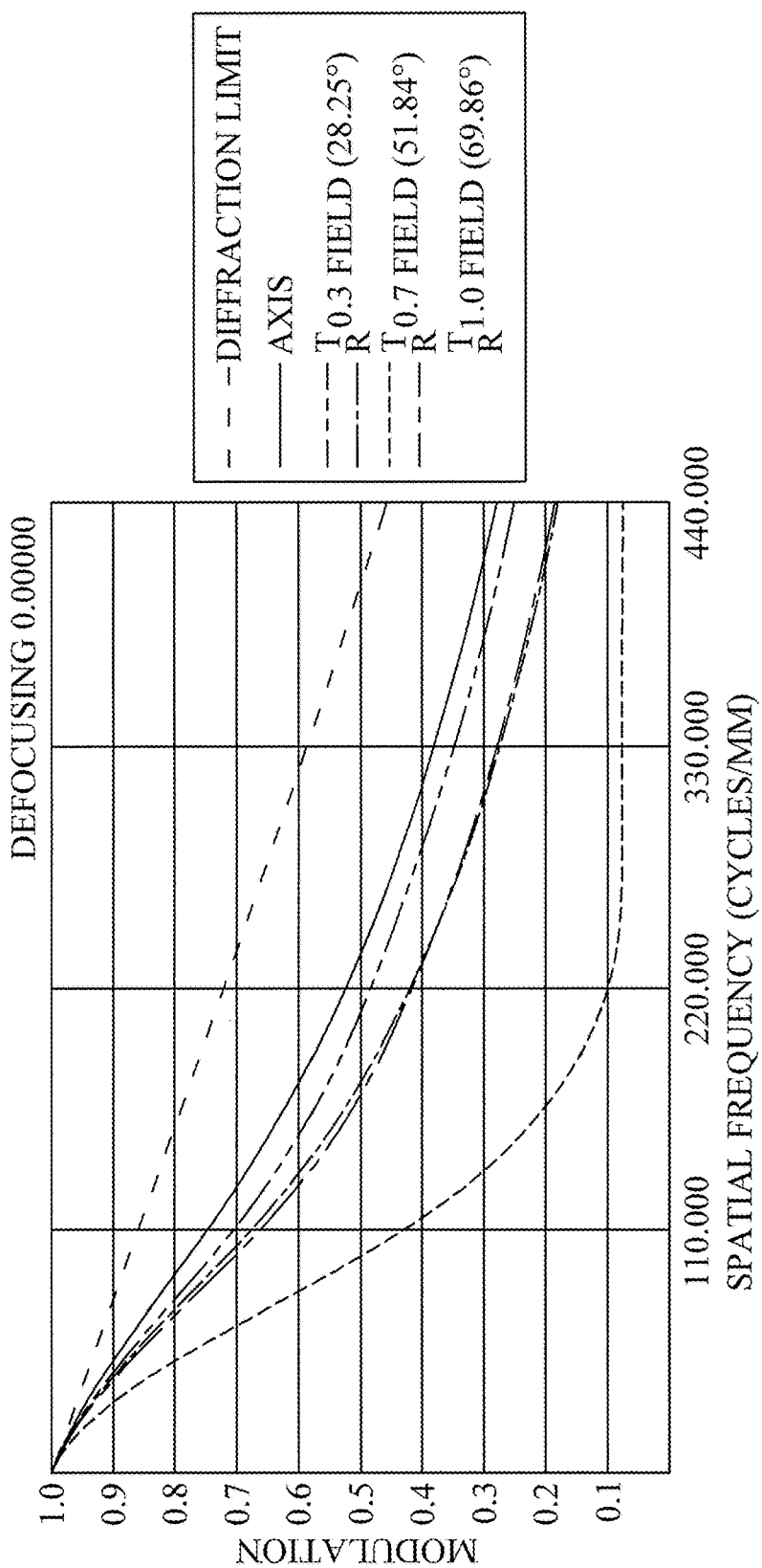
FIG. 5C is a characteristic diagram of modulation transfer of visible light spectrum for the optical image capturing system according to the fifth embodiment of the present invention.

Please refer to FIG. 5A to FIG. 5C. FIG. 5A is a schematic view of the optical image capturing system according to the fifth embodiment of the present invention. FIG. 5B shows the longitudinal spherical aberration curves, astigmatic field curves, and an optical distortion grid of the optical image capturing system, in the order from left to right, according to the fifth embodiment of the present invention. FIG. 5C is a characteristic diagram of modulation transfer of visible light spectrum for the optical image capturing system according to the fifth embodiment of the present invention. As shown in FIG. 5A, in the order from an object side to an image side, the optical image capturing system includes a first lens element 510, an aperture stop 500, a second lens element 520, a third lens element 530, a fourth lens element 540, an IR-bandstop filter 570, an image plane 580, and an image sensing device 590.

The first lens element 510 has negative refractive power and is made of plastic material. The first lens element 510 has a convex object-side surface 512 and a concave image-side surface 514, and both object-side surface 512 and image-side surface 514 are aspheric. The object-side surface 512 has an inflection point.

The second lens element 520 has negative refractive power and is made of plastic material. The second lens element 520 has a convex object-side surface 522 and a concave image-side surface 524, and both object-side surface 522 and image-side surface 524 are aspheric.

The third lens element 530 has positive refractive power and is made of plastic material. The third lens element 530 has a convex object-side surface 532 and a convex image-side surface 534, and both object-side surface 532 and image-side surface 534 are aspheric.

The fourth lens element 540 has positive refractive power and is made of plastic material. The fourth lens element 540 has a convex object-side surface 542 and a convex image-side surface 544. Both object-side surface 542 and image-side surface 544 are aspheric, and the image-side surface 544 has an inflection point.

The IR-bandstop filter 570 is made of glass material and is disposed between the fourth lens element 540 and the image plane 580, without affecting the focal length of the optical image capturing system.

Table 9 and Table 10 below should be incorporated into the reference of the present embodiment.

TABLE 9

Lens Parameters for the Fifth Embodiment
f(focal length) = 1.4025 mm; f/HEP = 1.8; HAF(half angle of view) = 69.9989 deg

| Surface No. | | Curvature Radius | Thickness (mm) | Material | Refractive Index | Abbe Number | Focal Length |
|---|---|---|---|---|---|---|---|
| 0 | Object | 1E+18 | 1E+13 | | | | |
| 1 | Lens 1 | 25.83622735 | 2.092 | Plastic | 1.565 | 58.00 | −5.496319 |
| 2 | | 2.016018126 | 5.601 | | | | |
| 3 | Aperture Stop | 9.529065668 | 10.205 | | 1.661 | 20.40 | −37.064765 |
| 4 | Lens 2 | 3.838023782 | 0.425 | Plastic | | | |
| 5 | | 1E+18 | −0.242 | | | | |
| 6 | Lens 3 | 2.360407751 | 0.774 | Plastic | 1.565 | 58.00 | 6.263935 |
| 7 | | −4.082409969 | 2.214 | | | | |
| 8 | Lens 4 | 9.301345888 | 1.269 | Plastic | 1.565 | 58.00 | 5.221376 |
| 9 | | −10.41800448 | 0.450 | | | | |
| 10 | IR-bandstop filter | 1E+18 | 0.850 | BK_7 | 1.517 | 64.13 | |
| 11 | | 1E+18 | 0.694 | | | | |
| 12 | Image plane | 1E+18 | −0.003 | | | | |

Reference wavelength = 555 nm

TABLE 10

The Aspheric Coefficients of the Fifth Embodiment
Table 10: Aspheric Coefficients

| Surface No. | 1 | 2 | 4 | 5 | 6 | 7 |
|---|---|---|---|---|---|---|
| k = | 1.693088E+00 | −9.981502E−01 | −5.179953E+00 | −1.593882E+01 | −7.397518E+00 | −1.856659E+00 |
| $A_4$ = | 2.013600E−04 | 4.876620E−03 | 7.381754E−05 | −5.015582E−03 | 1.041936E−02 | −4.898187E−03 |
| $A_6$ = | −1.124529E−06 | 1.197845E−04 | −4.024330E−06 | 1.100011E−02 | −5.144000E−03 | −1.952672E−03 |
| $A_8$ = | −2.511663E−08 | 5.287214E−06 | 2.350657E−07 | −5.225711E−03 | 3.682174E−04 | −8.394067E−04 |
| $A_{10}$ = | 1.543182E−10 | 2.080515E−06 | 1.076304E−07 | 1.695759E−03 | 1.041320E−04 | 4.016405E−05 |
| $A_{12}$ = | 0.000000E+00 | 0.000000E+00 | 0.000000E+00 | 0.000000E+00 | 0.000000E+00 | 0.000000E+00 |

TABLE 10-continued

The Aspheric Coefficients of the Fifth Embodiment
Table 10: Aspheric Coefficients

| Surface No. | 8 | 9 |
|---|---|---|
| k = | −5.000000E+01 | 2.221586E+00 |
| $A_4$ = | 1.364913E−02 | 1.267550E−02 |
| $A_6$ = | −2.360785E−03 | 1.759741E−03 |
| $A_8$ = | 4.518837E−04 | −6.713192E−04 |
| $A_{10}$ = | −4.008890E−05 | 1.064208E−04 |
| $A_{12}$ = | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

Fifth Embodiment (Primary Reference Wavelength = 555 nm)

| ETP1 | ETP2 | ETP3 | ETP4 | ED12/ED23 | SED |
|---|---|---|---|---|---|
| 2.127 | 10.216 | 0.725 | 1.254 | 28.591 | 8.007 |

| ETP1/TP1 | ETP2/TP2 | ETP3/TP3 | ETP4/TP4 | ED23/ED34 | SETP |
|---|---|---|---|---|---|
| 1.017 | 1.001 | 0.936 | 0.988 | 0.087 | 14.322 |

| ETL | EBL | EIN | EIR | PIR | STP |
|---|---|---|---|---|---|
| 24.327 | 1.998 | 22.329 | 0.457 | 0.450 | 14.341 |

| EIN/ETL | SETP/EIN | EIR/PIR | EBL/BL | BL | SETP/STP |
|---|---|---|---|---|---|
| 0.918 | 0.641 | 1.016 | 0.4831 | 4.1358 | 0.999 |

| ED12 | ED23 | ED34 | ED12/IN12 | ED23/IN23 | ED34/IN34 |
|---|---|---|---|---|---|
| 5.572 | 0.195 | 2.241 | 0.995 | 1.066 | 1.012 |

-continued

Fifth Embodiment (Primary Reference Wavelength = 555 nm)

| f4/ΣNP | IN12/f | IN23/f | IN34/f | TP3/f | TP4/f |
|---|---|---|---|---|---|
| 3.25059 | 3.99387 | 0.13032 | 1.57852 | 0.55211 | 0.90508 |

| InTL | HOS | HOS/HOI | InS/HOS | InTL/HOS | ΣTP/InTL |
|---|---|---|---|---|---|
| 22.33920 | 24.33010 | 9.73204 | 0.24687 | 0.91817 | 0.64197 |

| (TP1 + IN12)/TP2 | (TP4 + IN34)/TP3 | TP1/TP2 | TP3/TP4 | IN23/(TP2 + IN23 + TP3) |
|---|---|---|---|---|
| 0.75387 | 4.49836 | 0.20499 | 0.61002 | 0.01637 |

| |InRS41|/TP4 | |InRS42|/TP4 | HVT42/HOI | HVT42/HOS |
|---|---|---|---|
| 0.2309 | 0.0476 | 0.5197 | 0.0534 |

| MTFE0 | MTFE3 | MTFE7 | MTFQ0 | MTFQ3 | MTFQ7 |
|---|---|---|---|---|---|
| 0.9 | 0.87 | 0.78 | 0.75 | 0.71 | 0.44 |

The following values for the conditional expressions can be obtained from the data in Table 9 and Table 10.

Values Related to Inflection Point of Fifth Embodiment
(Primary Reference Wavelength = 555 nm)

| HIF111 | 7.1007 | HIF111/HOI | 2.2995 | SGI111 | 1.2869 | |SGI111|/(|SGI111| + TP1) | 0.3398 |
|---|---|---|---|---|---|---|---|
| HIF421 | 0.7571 | HIF421/HOI | 0.2452 | SGI421 | −0.0232 | |SGI421|/(|SGI421| + TP4) | 0.0092 |

-continued

Fifth Embodiment (Primary Reference Wavelength = 555 nm)

| InRS41 | InRS42 | HVT41 | HVT42 | ODT % | TDT % |
|---|---|---|---|---|---|
| 0.29311 | 0.06041 | 0.00000 | 1.29925 | −35.09570 | 34.93070 |

| |f/f1| | |f/f2| | |f/f3| | |f/f4| | |f1/f2| | |f2/f3| |
|---|---|---|---|---|---|
| 0.35198 | 0.04113 | 0.50838 | 0.15800 | 0.11685 | 12.36075 |

| ΣPPR | ΣNPR | ΣPPR/|ΣNPR| | ΣPP | ΣNP | f1/ΣPP |
|---|---|---|---|---|---|
| 0.19913 | 0.86036 | 0.23144 | −25.22391 | −1.22581 | −0.35192 |

Sixth Embodiment

Figure 6A:
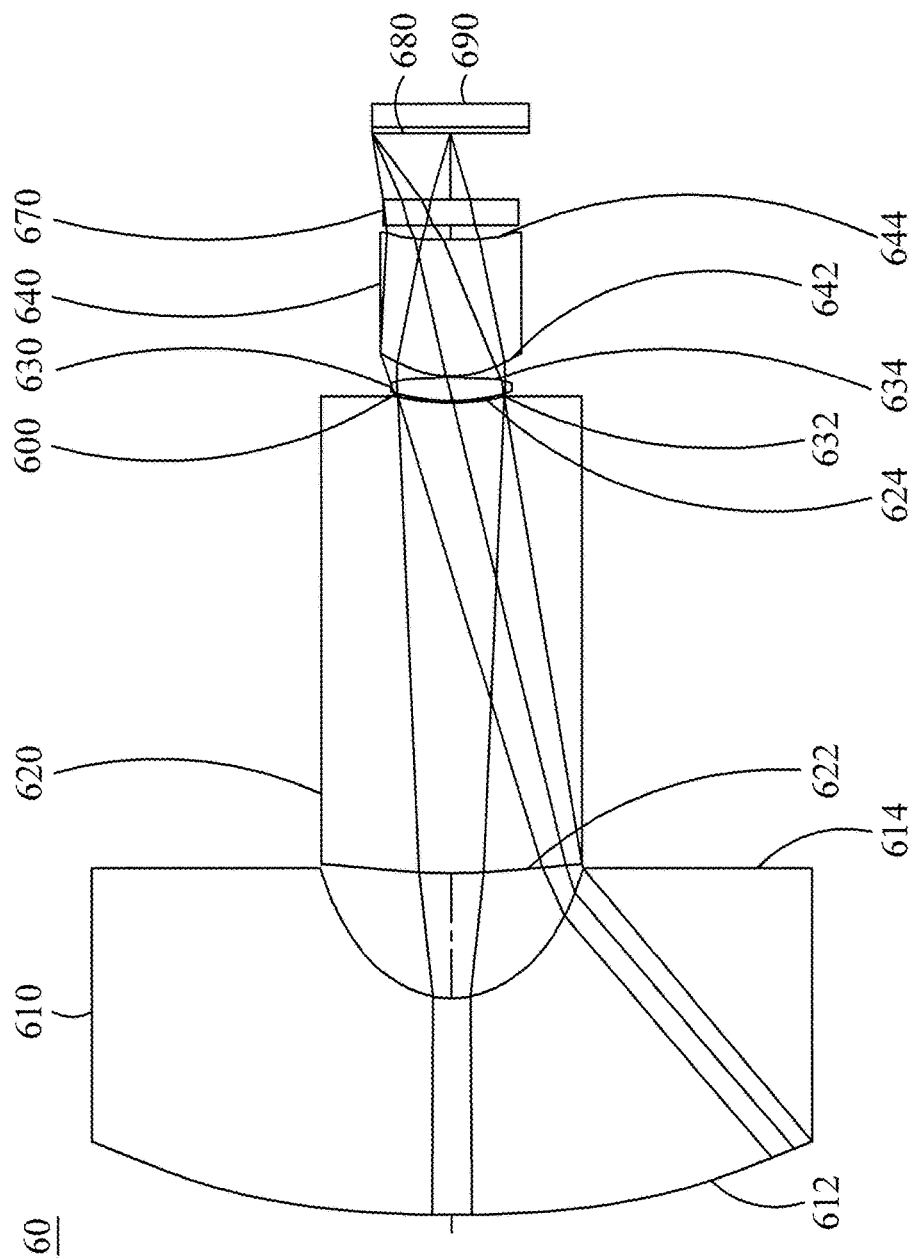
FIG. 6A is a schematic view of the optical image capturing system according to the sixth embodiment of the present invention.
Figure 6B:
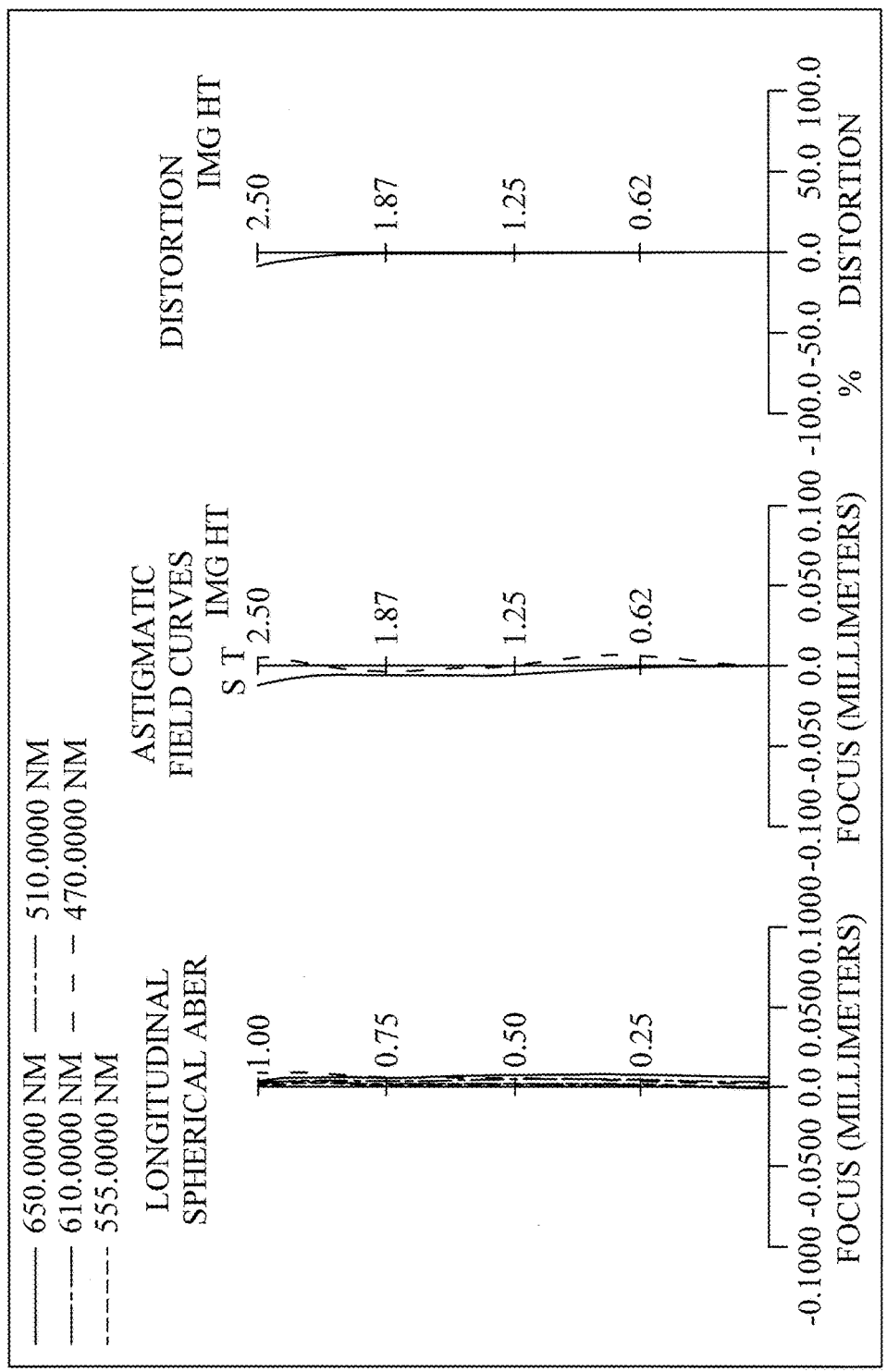
FIG. 6B shows the longitudinal spherical aberration curves, astigmatic field curves, and an optical distortion grid of the optical image capturing system in the order from left to right according to the sixth embodiment of the present invention.
Figure 6C:
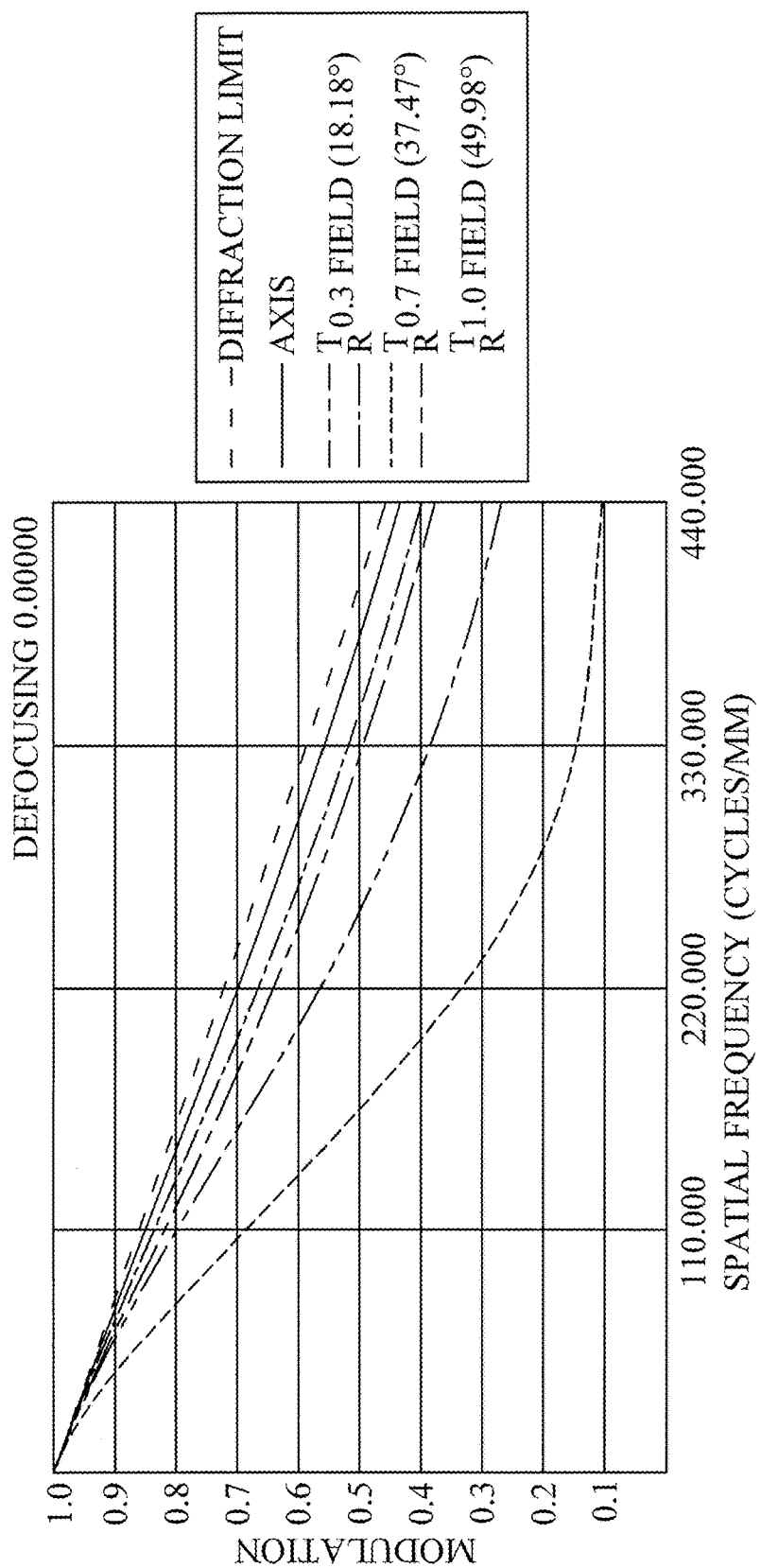
FIG. 6C is a characteristic diagram of modulation transfer of visible light spectrum for the optical image capturing system according to the sixth embodiment of the present invention.

Please refer to FIG. 6A to FIG. 6C. FIG. 6A is a schematic view of the optical image capturing system according to the sixth embodiment of the present invention. FIG. 6B shows the longitudinal spherical aberration curves, astigmatic field curves, and an optical distortion grid of the optical image capturing system, in the order from left to right, according to the sixth embodiment of the present invention. FIG. 6C is a characteristic diagram of modulation transfer of visible light spectrum for the optical image capturing system according to the sixth embodiment of the present invention. As shown in FIG. 6A, in the order from an object side to an image side, the optical image capturing system includes a first lens element 610, an aperture stop 600, a second lens element 620, a third lens element 630, a fourth lens element 640, an IR-bandstop filter 670, an image plane 680, and an image sensing device 690.

The first lens element 610 has negative refractive power and is made of plastic material. The first lens element 610 has a convex object-side surface 612 and a concave image-side surface 614, and both object-side surface 612 and image-side surface 614 are aspheric. The object-side surface 612 has an inflection point.

The second lens element 620 has negative refractive power and is made of plastic material. The second lens element 620 has a convex object-side surface 622 and a concave image-side surface 624, and both object-side surface 622 and image-side surface 624 are aspheric. The object-side surface 622 thereof has two inflection points.

The third lens element 630 has positive refractive power and is made of plastic material. The third lens element 630 has a convex object-side surface 632 and a convex image-side surface 634, and both object-side surface 632 and image-side surface 634 are aspheric.

The fourth lens element 640 has positive refractive power and is made of plastic material. The fourth lens element 640 has a convex object-side surface 642 and a concave image-side surface 644. Both object-side surface 642 and image-side surface 644 are aspheric.

The IR-bandstop filter 670 is made of glass material and is disposed between the fourth lens element 640 and the image plane 680, without affecting the focal length of the optical image capturing system.

Table 11 and Table 12 below should be incorporated into the reference of the present embodiment.

TABLE 11

Lens Parameters for the Sixth Embodiment
f(focal length) = 2.2840 mm; f/HEP = 1.8; HAF(half angle of view) = 49.9997 deg

| Surface No. | | Curvature Radius | Thickness (mm) | Material | Refractive Index | Abbe Number | Focal Length |
|---|---|---|---|---|---|---|---|
| 0 | Object | 1E+18 | 1E+13 | | | | |
| 1 | Lens 1 | 42.39644846 | 7.096 | Plastic | 1.565 | 58.00 | −6.058719 |
| 2 | | 2.984335897 | 4.101 | | | | |
| 3 | Aperture Stop | 18.59912138 | 15.368 | | | | |
| 4 | Lens 2 | 6.980984737 | 0.210 | Plastic | 1.661 | 20.40 | −35.595919 |
| 5 | | 1E+18 | −0.133 | | | | |
| 6 | Lens 3 | 7.371750701 | 0.764 | Plastic | 1.565 | 58.00 | 7.976578 |
| 7 | | −11.25206901 | 0.050 | | | | |
| 8 | Lens 4 | 3.177917139 | 4.436 | Plastic | 1.565 | 58.00 | 5.936202 |
| 9 | | 28.36496686 | 0.450 | | | | |
| 10 | IR-bandstop filter | 1E+18 | 0.850 | BK_7 | 1.517 | 64.13 | 1E+18 |
| 11 | | 1E+18 | 2.162 | | | | |
| 12 | Image Plane | 1E+18 | 0.002 | | | | |

Reference wavelength = 555 nm

TABLE 12

The Aspheric Coefficients of the Sixth Embodiment
Table 12: Aspheric Coefficients

| Surface No. | 1 | 2 | 4 | 5 | 6 | 7 |
|---|---|---|---|---|---|---|
| $k =$ | 5.178438E+00 | −1.522253E+00 | −9.181431E+00 | −2.864409E+00 | −9.789268E+00 | 1.715042E+01 |
| $A_4 =$ | 5.887589E−05 | 3.844905E−03 | −6.445071E−04 | 3.197102E−04 | 9.339617E−03 | 2.574129E−03 |
| $A_6 =$ | 1.577224E−08 | 1.178279E−05 | 3.285386E−05 | 6.802221E−04 | −6.148393E−04 | −5.097664E−04 |
| $A_8 =$ | −8.930188E−10 | 2.956037E−06 | −2.164545E−06 | −2.789403E−04 | −1.229013E−04 | 1.438652E−04 |
| $A_{10} =$ | −4.450853E−12 | 1.705368E−07 | 6.264913E−08 | 4.386200E−05 | 1.414274E−05 | −3.008316E−05 |
| $A_{12} =$ | 0.000000E+00 | 0.000000E+00 | 0.000000E+00 | 0.000000E+00 | 0.000000E+00 | 0.000000E+00 |

| Surface No. | 8 | 9 |
|---|---|---|
| $k =$ | −9.747403E−01 | −4.966781E+01 |
| $A_4 =$ | −2.661035E−03 | 7.634680E−03 |
| $A_6 =$ | 2.508898E−04 | 4.300564E−04 |
| $A_8 =$ | −6.861513E−06 | −1.558950E−06 |
| $A_{10} =$ | −1.468172E−06 | −6.925446E−07 |
| $A_{12} =$ | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| ETP1 | ETP2 | ETP3 | ETP4 | ED12/ED23 | SED |
| 7.159 | 15.386 | 0.718 | 4.381 | 52.996 | 4.251 |
| ETP1/TP1 | ETP2/TP2 | ETP3/TP3 | ETP4/TP4 | ED23/ED34 | SETP |
| 1.009 | 1.001 | 0.940 | 0.988 | 0.584 | 27.644 |
| ETL | EBL | EIN | EIR | PIR | STP |
| 35.351 | 3.456 | 31.895 | 0.442 | 0.450 | 27.664 |
| EIN/ETL | SETP/EIN | EIR/PIR | EBL/BL | BL | SETP/STP |
| 0.902 | 0.867 | 0.982 | 1.44 | 2.4 | 0.999 |
| ED12 | ED23 | ED34 | ED12/IN12 | ED23/IN23 | ED34/IN34 |
| 4.044 | 0.076 | 0.131 | 0.986 | 0.994 | 2.614 |
| InRS41 | InRS42 | HVT41 | HVT42 | ODT % | TDT % |
| 0.75811 | 0.23339 | 0.00000 | 0.00000 | −8.18003 | 8.19904 |
| \|f/f1\| | \|f/f2\| | \|f/f3\| | \|f/f4\| | \|f1/f2\| | \|f2/f3\| |
| 0.37698 | 0.06417 | 0.28634 | 0.38476 | 0.17021 | 4.46255 |
| ΣPPR | ΣNPR | ΣPPR/\|ΣNPR\| | ΣPP | ΣNP | f1/ΣPP |
| 0.73527 | 0.37698 | 1.95041 | −21.68312 | −6.05872 | −0.27377 |
| f4/ΣNP | IN12/f | IN23/f | IN34/f | TP3/f | TP4/f |
| 1.00000 | 1.79566 | 0.03362 | 0.02189 | 0.33468 | 1.94222 |
| InTL | HOS | HOS/HOI | InS/HOS | InTL/HOS | ΣTP/InTL |
| 31.89190 | 35.35570 | 14.14228 | 0.24272 | 0.90203 | 0.86742 |
| (TP1 + IN12)/TP2 | (TP4 + IN34)/TP3 | TP1/TP2 | TP3/TP4 | IN23/(TP2 + IN23 + TP3) | |
| 0.72860 | 5.86853 | 0.46172 | 0.17232 | 0.00474 | |
| \|InRS41\|/TP4 | \|InRS42\|/TP4 | HVT42/HOI | HVT42/HOS | | |
| 0.1709 | 0.0526 | 0.0000 | 0.0000 | | |
| MTFE0 | MTFE3 | MTFE7 | MTFQ0 | MTFQ3 | MTFQ7 |
| 0.94 | 0.92 | 0.87 | 0.85 | 0.8 | 0.68 |

The following values for the conditional expressions can be obtained from the data in Table 11 and Table 12:

| Values Related to Inflection Point of Sixth Embodiment (Primary Reference Wavelength = 555 nm) | | | | | |
|---|---|---|---|---|---|
| HIF111 | 10.5936 | HIF111/HOI | 4.2647 | SGI111 | 2.0269 | \|SGI111\|/(\|SGI111\| + TP1) | 0.7170 |
| HIF211 | 2.9650 | HIF211/HOI | 1.1936 | SGI211 | 0.1881 | \|SGI211\|/(\|SGI211\| + TP2) | 0.0702 |
| HIF212 | 3.6790 | HIF212/HOI | 1.4811 | SGI212 | 0.2578 | \|SGI212\|/(\|SGI212\| + TP2) | 0.0938 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
    a first lens element with refractive power;
    a second lens element with refractive power;
    a third lens element with refractive power;
    a fourth lens element with refractive power; and
    an image plane;
    wherein the optical image capturing system comprises four lens elements with refractive power, at least one of the four lens elements has positive refractive power; a focal length of the optical image capturing system is f, and an entrance pupil diameter of the optical image capturing system is HEP; a distance on an optical axis from an object-side surface of the first lens element to the image plane is HOS, a distance on the optical axis from the object-side surface of the first lens element to an image-side surface of the fourth lens element is InTL, half of a maximum viewable angle of the optical image capturing system is denoted by HAF; thicknesses of the first to fourth lens elements at height of ½ HEP paralleling the optical axis are respectively ETP1, ETP2, ETP3 and ETP4; a sum of ETP1 to ETP4 described above is SETP; central thicknesses of the first to fourth lens elements on the optical axis are respectively TP1, TP2, TP3 and TP4; a sum of TP1 to TP4 described above is STP; conditions as follows are satisfied: 1.0≤f/HEP≤10.0, 0 deg<HAF≤150 deg and 0.5≤SETP/STP<1.

2. The optical image capturing system of claim 1, wherein a horizontal distance paralleling the optical axis from a coordinate point on the object-side surface of the first lens element at height of ½ HEP to the image plane is ETL; a horizontal distance paralleling the optical axis from the coordinate point on the object-side surface of the first lens element at height of ½ HEP to a coordinate point on the image-side surface of the fourth lens element at height of ½ HEP is EN; conditions as follows are satisfied: 0.2≤EIN/ETL<1.

3. The optical image capturing system of claim 1, wherein a thickness paralleling the optical axis of the first lens element at height of ½ HEP is ETP1, a thickness paralleling the optical axis of the second lens element at height of ½ HEP is ETP2, a thickness paralleling the optical axis of the third lens element at height of ½ HEP is ETP3, a thickness paralleling the optical axis of the fourth lens element at height of ½ HEP is ETP4, the sum of ETP1 through ETP4 described above is SETP; a horizontal distance paralleling the optical axis from the coordinate point on the object-side surface of the first lens element at height of ½ HEP to a coordinate point on the image-side surface of the fourth lens element at height of ½ HEP is EIN; and conditions as follows are satisfied: 0.3≤SETP/EIN≤1.

4. The optical image capturing system of claim 1, wherein the optical image capturing system comprises a light filtering element, the light filtering element is located between the fourth lens element and the image plane, a distance paralleling the optical axis from a coordinate point on the image-side surface of the fourth lens element at height of ½ HEP to the light filtering element is EIR, a distance paralleling the optical axis from an axial point on the image-side surface of the fourth lens element to the light filtering element is PIR, and conditions as follows are satisfied: 0.1≤EIR/PIR≤1.1.

5. The optical image capturing system of claim 1, wherein the first lens element has negative refractive power.

6. The optical image capturing system of claim 1, wherein the optical image capturing system has a maximum image height HOI on the image plane perpendicular to the optical axis, modulation transfer rates of visible light at spatial frequency of 55 cycles/mm at positions of the optical axis, 0.3 HOI and 0.7 HOI on the image plane are respectively denoted by MTFE0, MTFE3 and MTFE7, and conditions as follows are satisfied: MTFE0≥0.2, MTFE3≥0.01 and MTFE7≥0.01.

7. The optical image capturing system of claim 1, wherein the image plane is a plane or a curved surface.

8. The optical image capturing system of claim 1, wherein a horizontal distance paralleling the optical axis from a coordinate point on the image-side surface of the fourth lens element at height of ½ HEP to the image plane is EBL, a horizontal distance paralleling the optical axis from an axial point on the image-side surface of the fourth lens element to the image plane is BL, and conditions as follows are satisfied: 0.1≤EBL/BL≤1.5.

9. The optical image capturing system of claim 1, further comprising an aperture stop, wherein a distance on the optical axis from the aperture stop to the image plane is InS, and condition as follows is satisfied: 0.2≤InS/HOS≤1.1.

10. An optical image capturing system, from an object side to an image side, comprising:
a first lens element with refractive power;
a second lens element with refractive power;
a third lens element with refractive power;
a fourth lens element with refractive power; and
an image plane;
wherein the optical image capturing system comprises four lens elements with refractive power, at least one of the four lens elements has at least one inflection point on at least one surface thereof; at least one of the second lens element to fourth lens element has positive refractive power; a focal length of the optical image capturing system is f; an entrance pupil diameter of the optical image capturing system is HEP; a distance on an optical axis from an object-side surface of the first lens element to the image plane is HOS, a distance on the optical axis from the object-side surface of the first lens element to an image-side surface of the fourth lens element is InTL, half of a maximum viewable angle of the optical image capturing system is denoted by HAF; a horizontal distance paralleling the optical axis from a coordinate point on the object-side surface of the first lens element at height of ½ HEP to the image plane is ETL; a horizontal distance paralleling the optical axis from the coordinate point on the object-side surface of the first lens element at height of ½ HEP to a coordinate point on the image-side surface of the fourth lens element at height of ½ HEP is EIN; and condition as follows is satisfied: 1.0≤f/HEP≤10.0, 0 deg<HAF≤150 deg and 0.2≤EIN/ETL<1.

11. The optical image capturing system of claim 10, wherein a horizontal distance paralleling the optical axis from a coordinate point on an image-side surface of the third lens element at height of ½ HEP to a coordinate point on an object-side surface of the fourth lens element at height of ½ HEP is ED34; a distance between the third lens element and the fourth lens element on the optical axis is IN34 and condition as follows is satisfied: 0<ED34/IN34≤50.

12. The optical image capturing system of claim 10, wherein a horizontal distance paralleling the optical axis from a coordinate point on an image-side surface of the first lens element at height of ½ HEP to a coordinate point on an object-side surface of the second lens element at height of ½ HEP is ED12; a distance between the first lens element and the second lens element on the optical axis is IN12 and condition as follows is satisfied: 0<ED12/IN12≤35.

13. The optical image capturing system of claim 10, wherein a thickness of the second lens element at height of ½ HEP paralleling the optical axis is ETP2, a central thickness of the second lens element on the optical axis is TP2, which satisfies condition as follows: 0.1≤ETP2/TP2≤5.

14. The optical image capturing system of claim 10, wherein a thickness of the third lens element at height of ½ HEP paralleling the optical axis is ETP3, a central thickness of the third lens element on the optical axis is TP3, which satisfies condition as follows: 0.1≤ETP3/TP3≤5.

15. The optical image capturing system of claim 10, wherein a thickness of the fourth lens element at height of ½ HEP paralleling the optical axis is ETP4, a central thickness of the fourth lens element on the optical axis is TP4, which satisfies condition as follows: 0.1≤ETP4/TP4≤5.

16. The optical image capturing system of claim 10, wherein a distance between the first lens element and the second lens element on the optical axis is IN12, condition as follows is satisfied: 0<IN12/f≤60.

17. The optical image capturing system of claim 10, the optical image capturing system has a maximum image height HOI on the image plane perpendicular to the optical axis, modulation transfer rate of infrared with operation wavelength of 850 nm at spatial frequency of 55 cycles/mm at positions of the optical axis, 0.3 HOI and 0.7 HOI on the image plane are respectively denoted by MTFI0, MTFI3 and MTFI7, and conditions as follows are satisfied: MTFI0≥0.01, MTFI3≥0.01, and MTFI7≥0.01.

18. The optical image capturing system of claim 10, wherein the optical image capturing system has a maximum image height HOI on the image plane perpendicular to the optical axis, modulation transfer rates of visible light at spatial frequency of 110 cycles/mm at positions of the optical axis, 0.3 HOI and 0.7 HOI on the image plane are respectively denoted by MTFQ0, MTFQ3 and MTFQ7, and conditions as follows are satisfied: MTFQ0≥0.2, MTFQ3≥0.01, and MTFQ7≥0.01.

19. The optical image capturing system of claim 10, wherein at least one lens element among the first lens element, the second lens element, the third lens element and the fourth lens element is a filter element of light with wavelength of less than 500 nm.

20. An optical image capturing system, from an object side to an image side, comprising:
a first lens element with negative refractive power;
a second lens element with refractive power;
a third lens element with refractive power;
a fourth lens element with refractive power; at least one of an object-side surface and an image-side surface thereof having at least one inflection point; and
an image plane;

wherein the optical image capturing system comprises four lens elements with refractive power, at least one lens element among the first lens elements to the third lens element has at least one inflection point on at least one surface thereof; a focal length of the optical image capturing system is f; an entrance pupil diameter of the optical image capturing system is HEP; a distance on an optical axis from an object-side surface of the first lens element to the image plane is HOS, a distance on the optical axis from the object-side surface of the first lens element to an image-side surface of the fourth lens element is InTL, half of a maximum viewable angle of the optical image capturing system is denoted by HAF; a horizontal distance paralleling the optical axis from a coordinate point on the object-side surface of the first lens element at height of ½ HEP to the image plane is ETL; a horizontal distance paralleling the optical axis from the coordinate point on the object-side surface of the first lens element at height of ½ HEP to a coordinate point on the image-side surface of the fourth lens element at height of ½ HEP is EIN; and condition as follows is satisfied: 1.0≤f/HEP≤10.0, 0 deg<HAF≤100 deg and 0.2≤EIN/ETL<1.

21. The optical image capturing system of claim 20, wherein a horizontal distance paralleling the optical axis from a coordinate point on the image-side surface of the fourth lens element at height ½ HEP to the image plane is EBL; a horizontal distance paralleling the optical axis from an axial point on the image-side surface of the fourth lens element to the image plane is BL; condition as follows is satisfied: 0.1≤EBL/BL≤1.5.

22. The optical image capturing system of claim 20, wherein a horizontal distance paralleling the optical axis from a coordinate point on an image-side surface of the third lens element at height of ½ HEP to a coordinate point on an object-side surface of the fourth lens element at height of ½ HEP is ED34; a distance between the third lens element and the fourth lens element on the optical axis is IN34 and condition as follows is satisfied: 0<ED34/IN34≤50.

23. The optical image capturing system of claim 20, wherein a distance between the third lens element and the fourth lens element on the optical axis is IN34, condition as follows is satisfied: 0<IN34/f≤5.

24. The optical image capturing system of claim 23, satisfying condition as follows: 0 mm<HOS≤50 mm.

25. The optical image capturing system of claim 23, further comprising an aperture stop, an image sensing device, and a driving module, wherein the image sensing device is disposed on the image plane, a distance on the optical axis from the aperture stop to the image plane is InS, and the driving module couples with the four lens elements and enables movements of those lens elements; conditions as follows are satisfied: 0.2≤InS/HOS≤1.1.

* * * * *